(12) United States Patent
Onozaki

(10) Patent No.: US 8,363,333 B2
(45) Date of Patent: Jan. 29, 2013

(54) MACRO LENS SYSTEM

(75) Inventor: Tatsuyuki Onozaki, Tokyo (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 0 days.

(21) Appl. No.: 13/217,643

(22) Filed: Aug. 25, 2011

(65) Prior Publication Data

US 2012/0050885 A1    Mar. 1, 2012

(30) Foreign Application Priority Data

Aug. 30, 2010  (JP) .................. 2010-191680

(51) Int. Cl.
  *G02B 15/14*    (2006.01)
(52) U.S. Cl. ...................... 359/693; 359/686
(58) Field of Classification Search .................. 359/686, 359/693, 683
See application file for complete search history.

(56) References Cited

U.S. PATENT DOCUMENTS

| | | | | |
|---|---|---|---|---|
| 7,898,744 B2 * | 3/2011 | Wada | ............................ | 359/686 |
| 2004/0017617 A1 | 1/2004 | Taki | | |
| 2006/0007342 A1 | 1/2006 | Taki | | |
| 2008/0225406 A1 | 9/2008 | Wada | | |
| 2009/0251589 A1 | 10/2009 | Taki | | |
| 2011/0134538 A1 | 6/2011 | Wada | | |

FOREIGN PATENT DOCUMENTS

| | | |
|---|---|---|
| JP | 2004-61680 | 2/2004 |
| JP | 2008-257200 | 10/2008 |
| JP | 2009-15026 | 1/2009 |
| JP | 2009-63715 | 3/2009 |

\* cited by examiner

*Primary Examiner* — Scott J Sugarman

(74) *Attorney, Agent, or Firm* — Greenblum & Bernstein P.L.C.

(57) ABSTRACT

A macro lens system includes a positive first lens group, a negative second lens group, a positive third lens group, and a negative fourth lens group, in that order from the object. Upon focusing from an infinite photographic distance to a life-sized photographic distance, the first lens group remains stationary with respect to the imaging plane, and the second and third lens groups move along the optical axis direction. The macro lens system satisfies the following condition: $-4.6 < f2/fi < -3.0$ wherein f2 designates the focal length of the second lens group; and fi the focal length of the entire the macro lens system when an object at infinity is in an in-focus state.

6 Claims, 37 Drawing Sheets

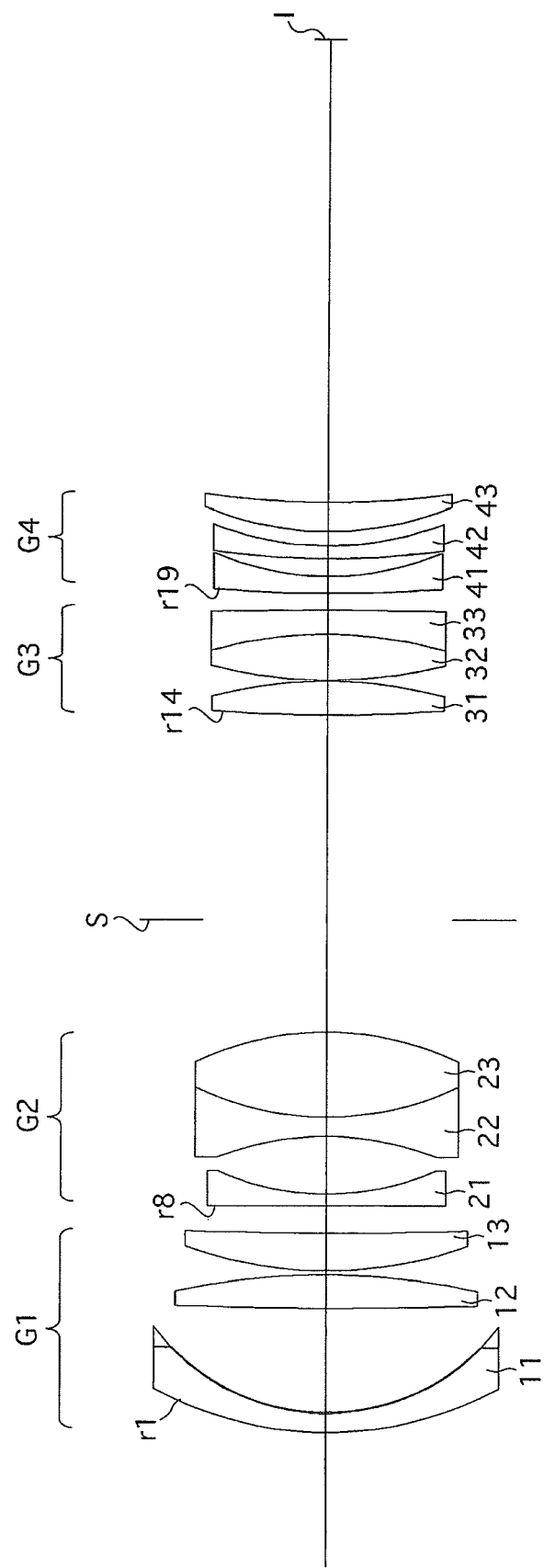

FNO.=2.9

-0.5  0.5
SPHERICAL ABERRATION
CHROMATIC ABERRATION

— d Line
······ g Line
----- C Line

Y=34.85

-0.05  0.05
LATERAL CHROMATIC ABERRATION

Y=34.85

-0.5  0.5
ASTIGMATISM

— S
······ M

Y=34.85

-5.0  5.0 %
DISTORTION

Y=0.00   +0.20

-0.20

Y=24.50  +0.20

-0.20

Y=34.85  +0.20

-0.20

— d Line
······ g Line
----- C Line

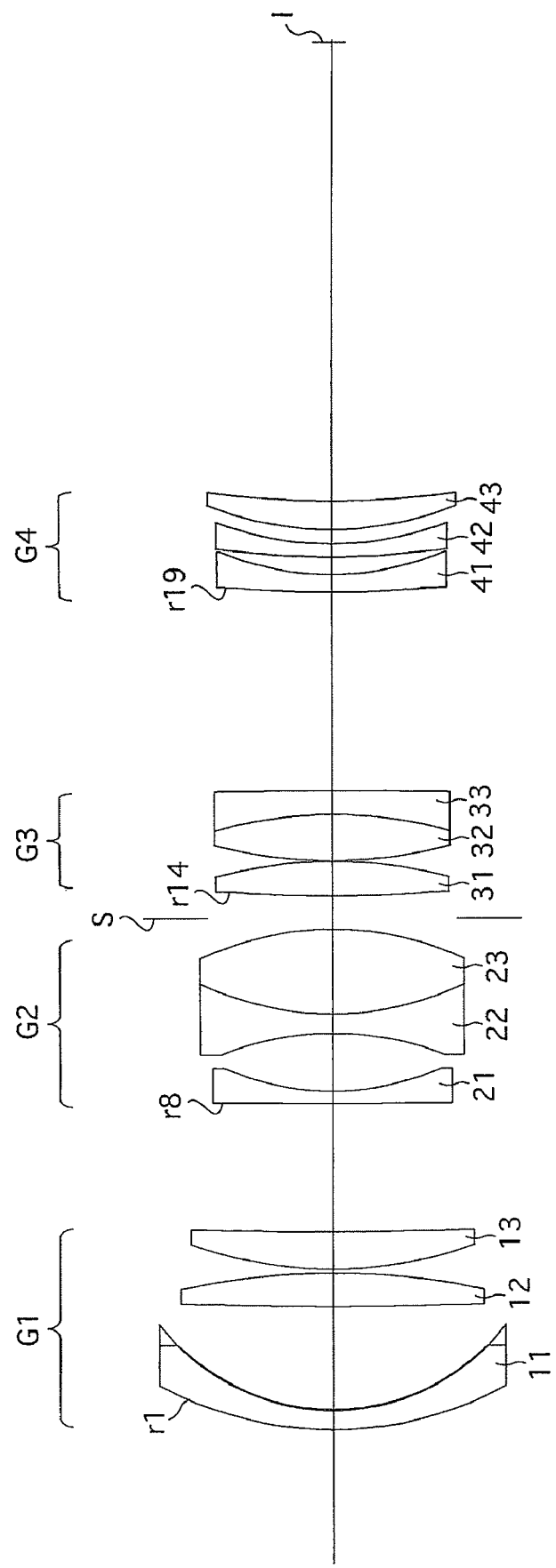

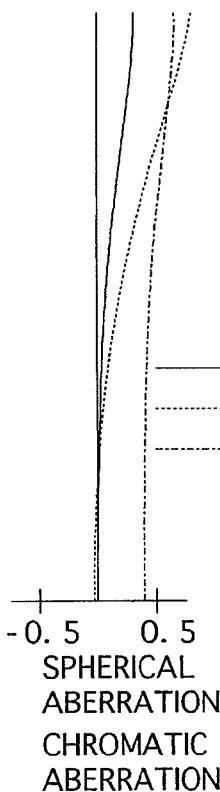
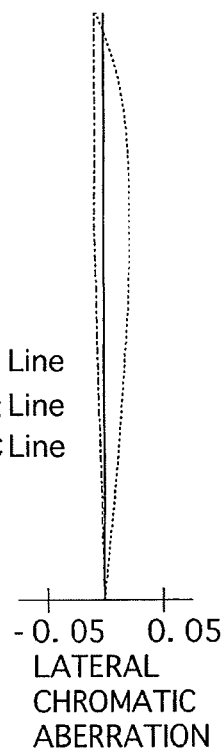
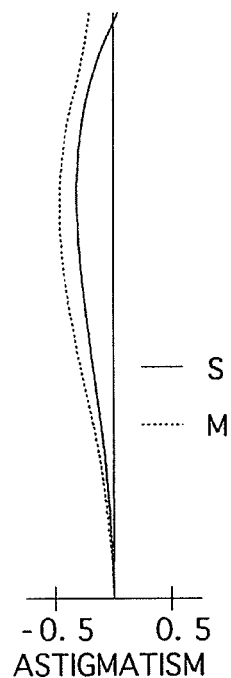
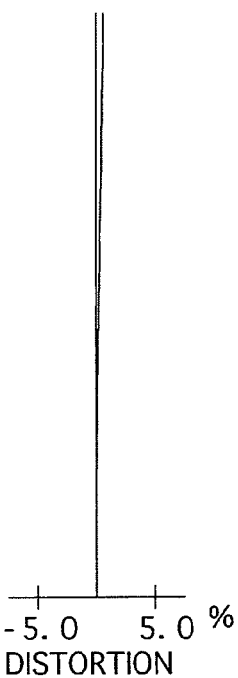
Fig. 5A  FE=4.2  SPHERICAL ABERRATION CHROMATIC ABERRATION
Fig. 5B  Y=34.85  LATERAL CHROMATIC ABERRATION
Fig. 5C  Y=34.85  ASTIGMATISM
Fig. 5D  Y=34.85  DISTORTION
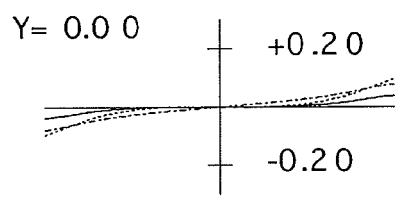
Fig. 6A  Y=0.00
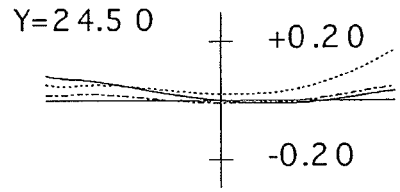
Fig. 6B  Y=24.50
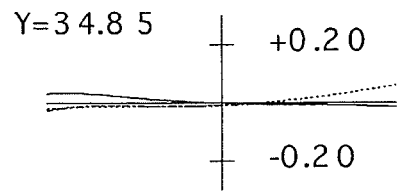
Fig. 6C  Y=34.85

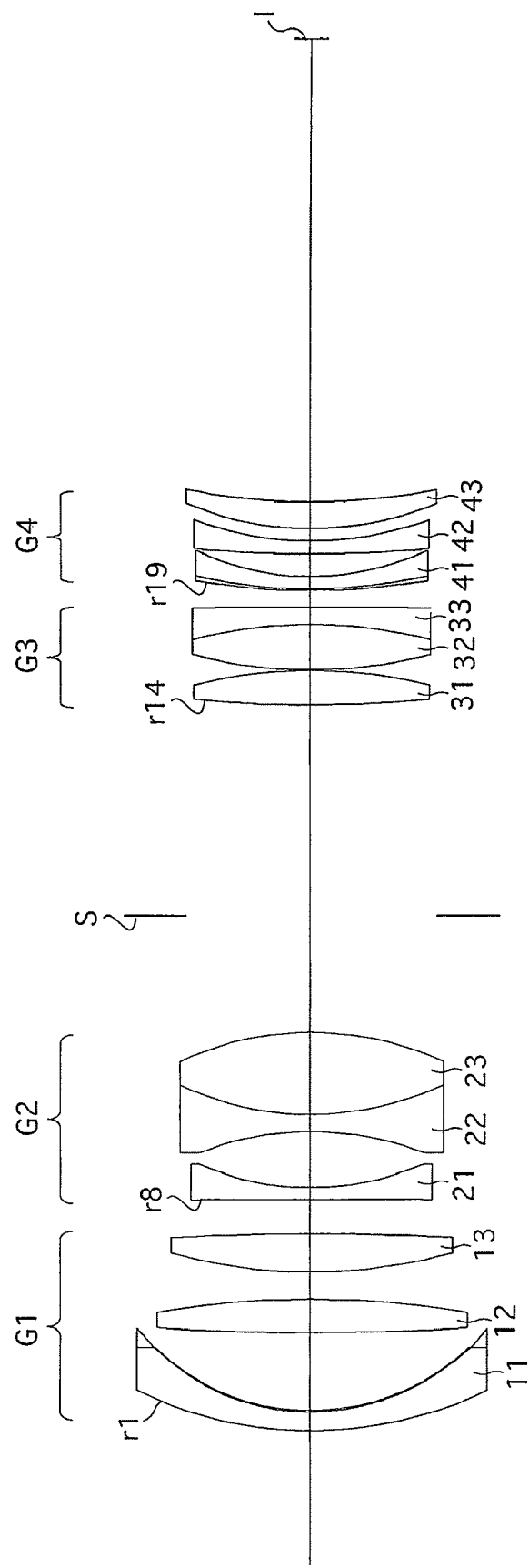

FNO.=2.9

—— d Line
········ g Line
-·-·- C Line

-0.5  0.5
SPHERICAL
ABERRATION
CHROMATIC
ABERRATION

Y=34.85

-0.05  0.05
LATERAL
CHROMATIC
ABERRATION

Y=34.85

—— S
······ M

-0.5  0.5
ASTIGMATISM

Y=34.85

-5.0  5.0 %
DISTORTION

Y=0.00   +0.20
         -0.20

Y=24.50  +0.20
         -0.20

Y=34.85  +0.20

—— d Line
········ g Line
-·-·- C Line

-0.20

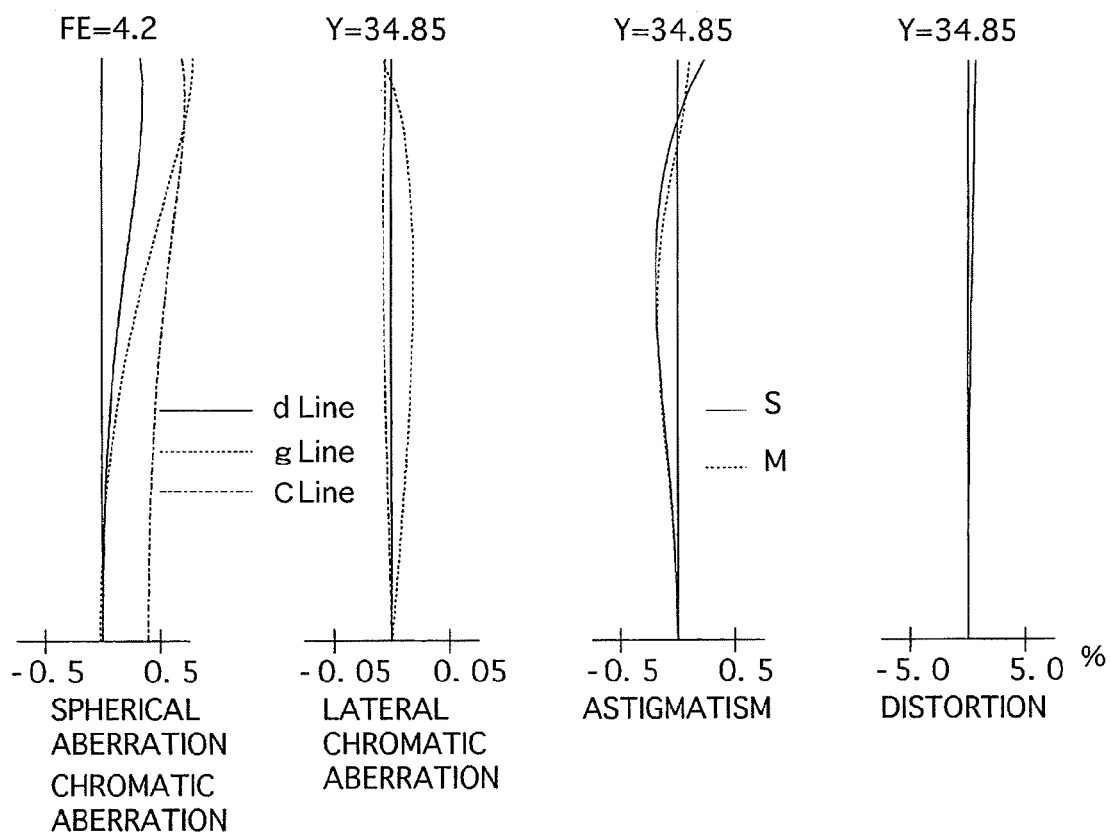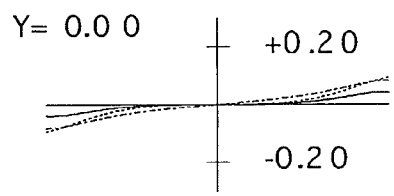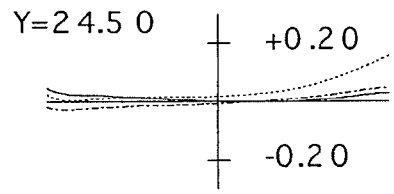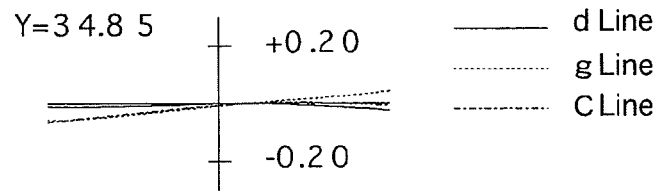

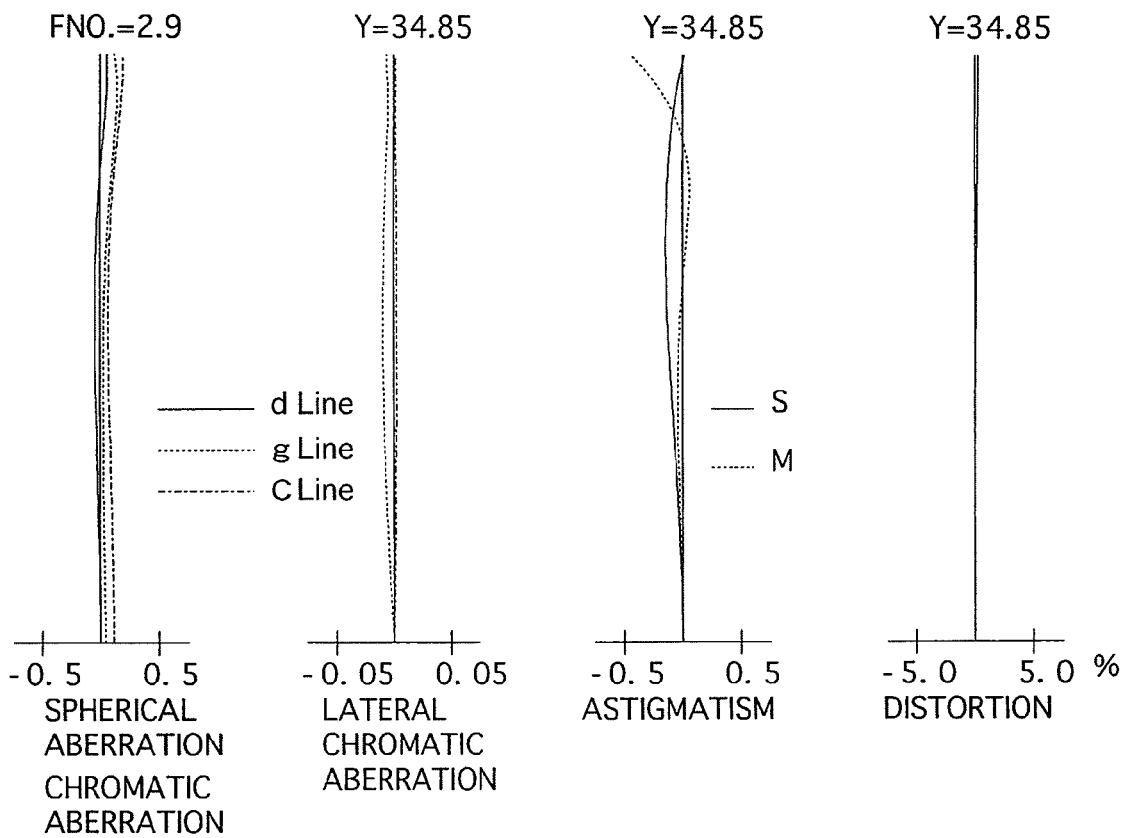
Fig. 14A  Fig. 14B  Fig. 14C  Fig. 14D
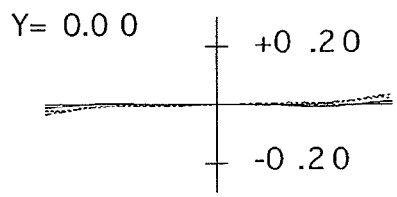
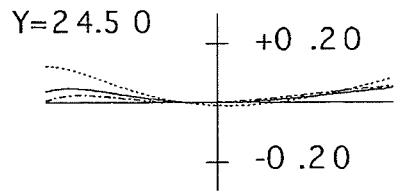
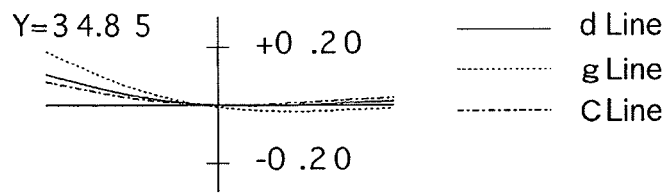

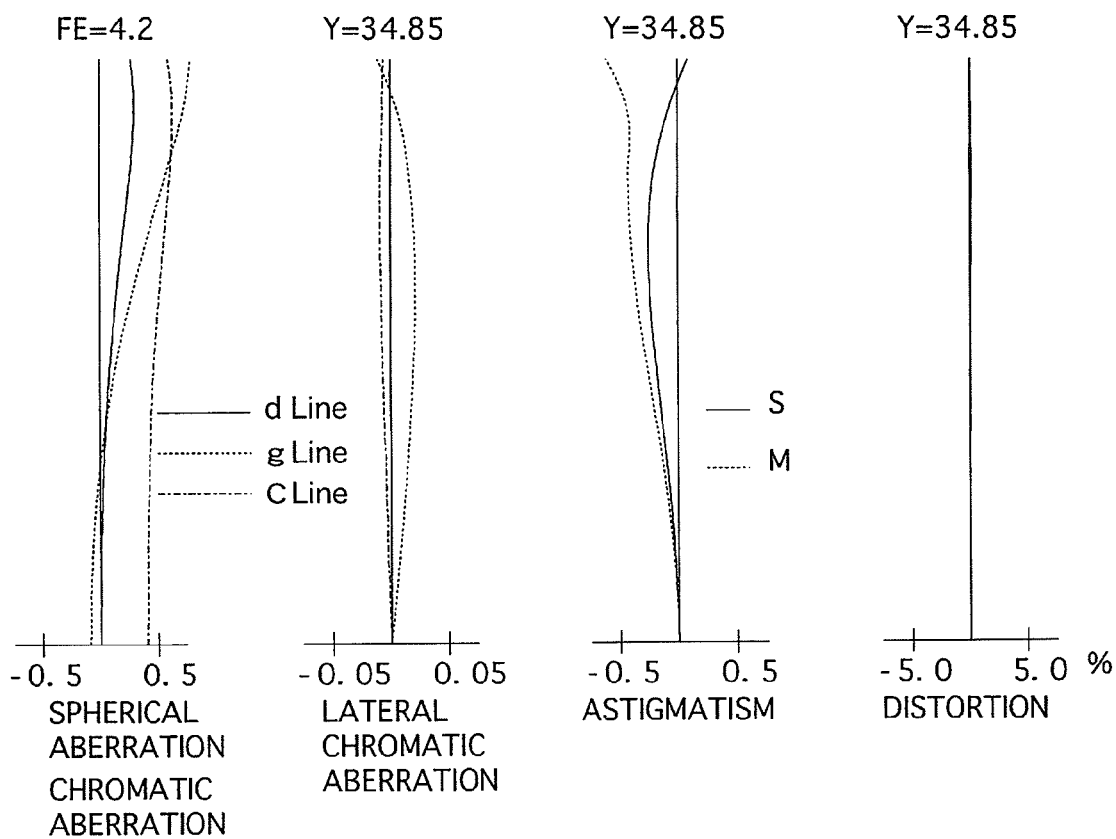
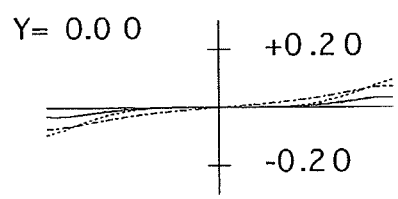
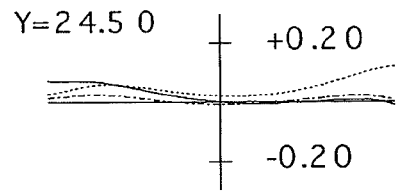
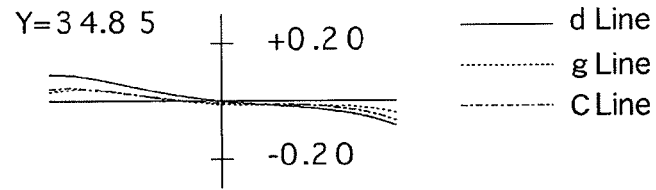

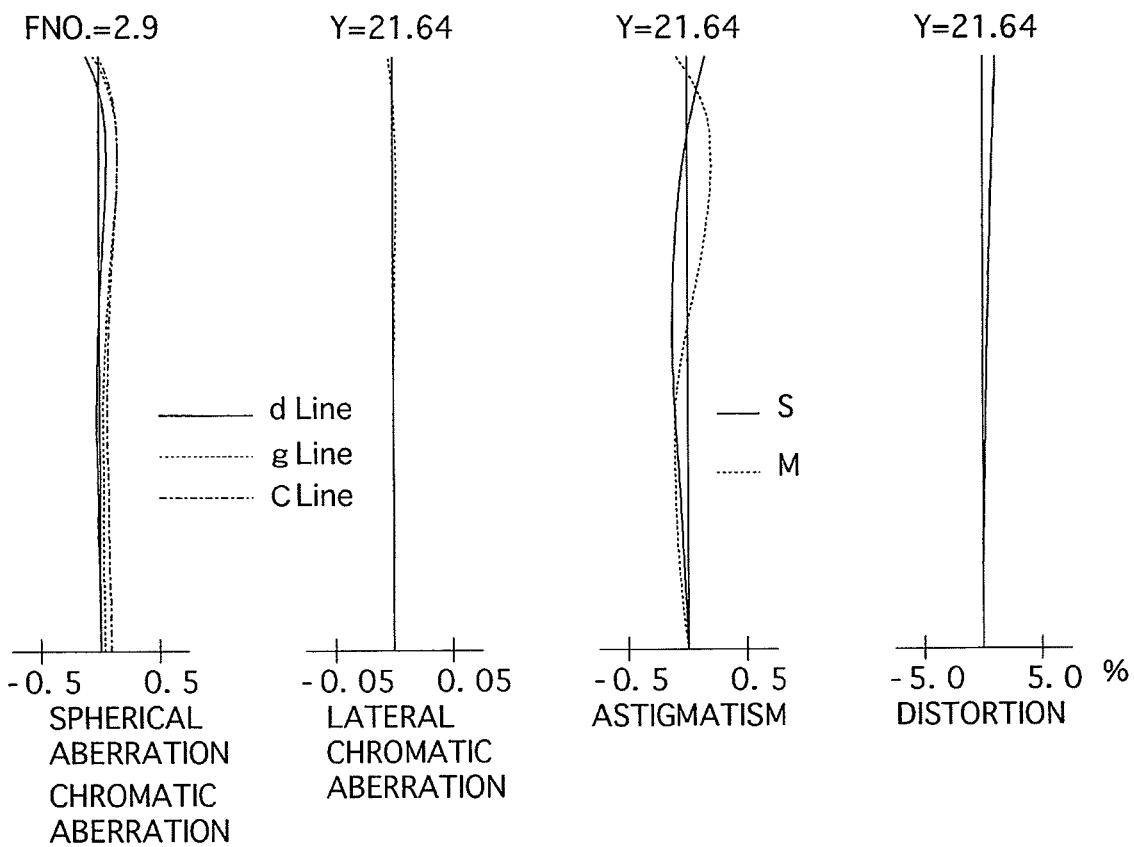
Fig. 32A  Fig. 32B  Fig. 32C  Fig. 32D
FNO.=2.9   Y=21.64   Y=21.64   Y=21.64
SPHERICAL ABERRATION CHROMATIC ABERRATION — LATERAL CHROMATIC ABERRATION — ASTIGMATISM — DISTORTION
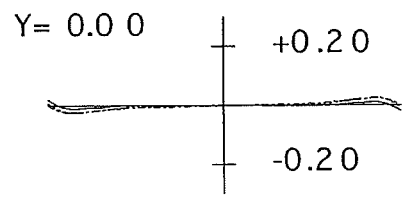
Fig. 33A  Y=0.00
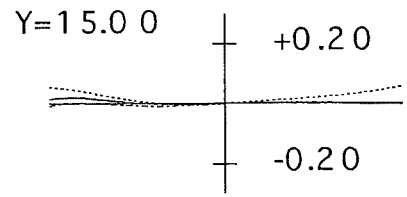
Fig. 33B  Y=15.00
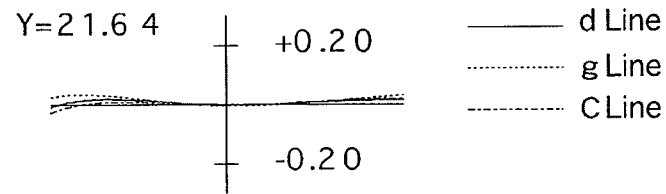
Fig. 33C  Y=21.64

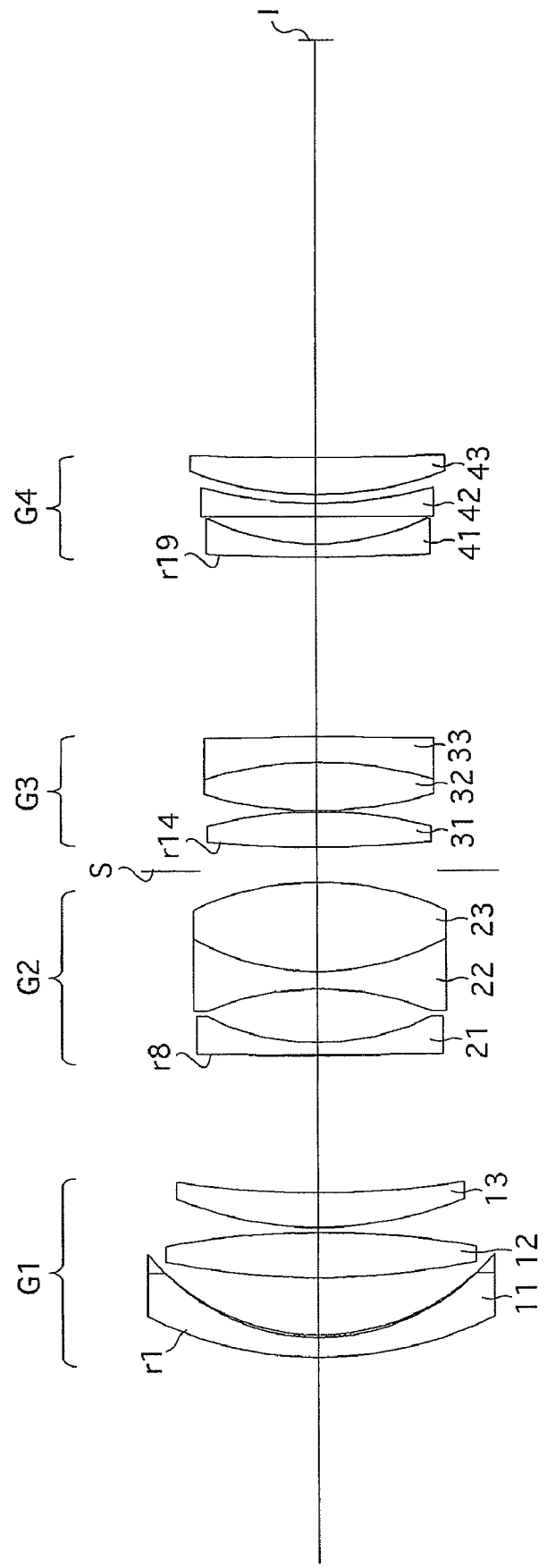

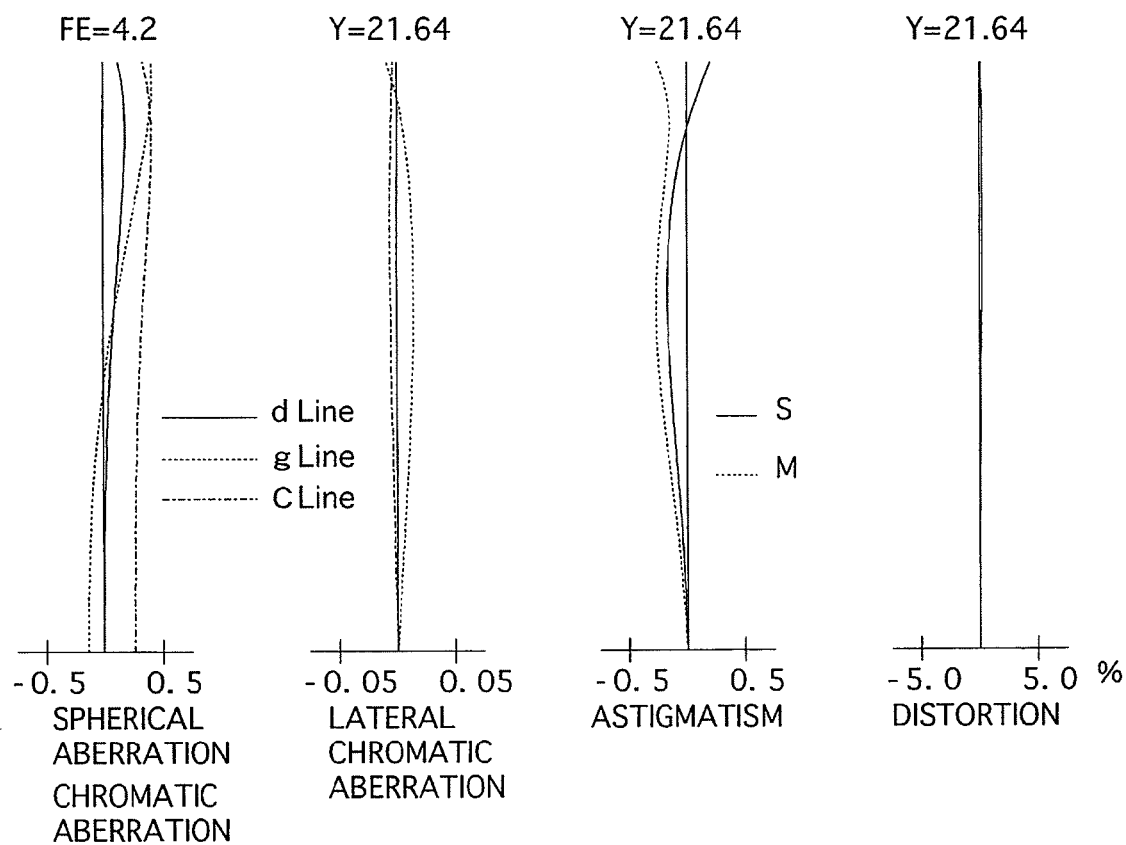
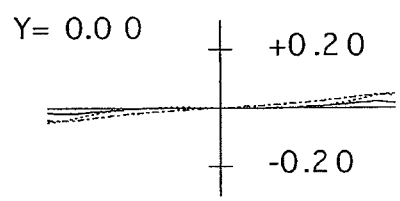
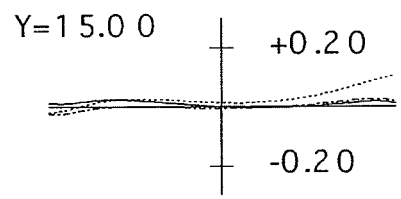
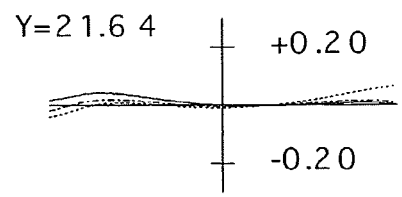

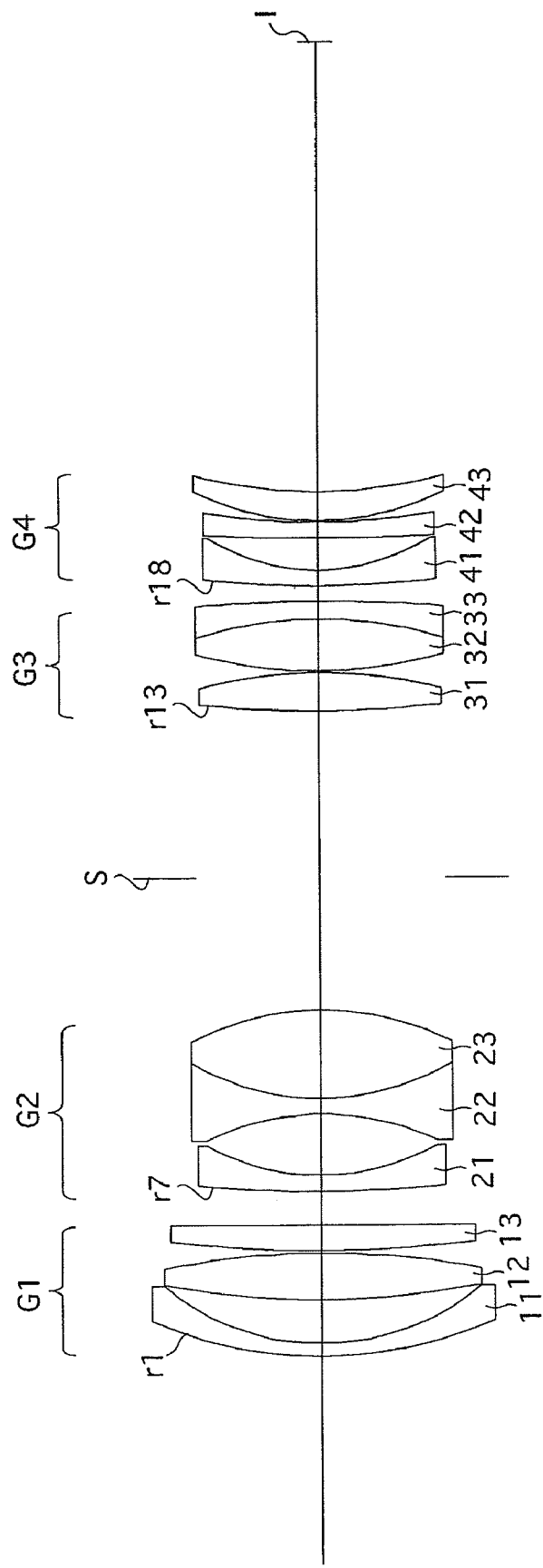

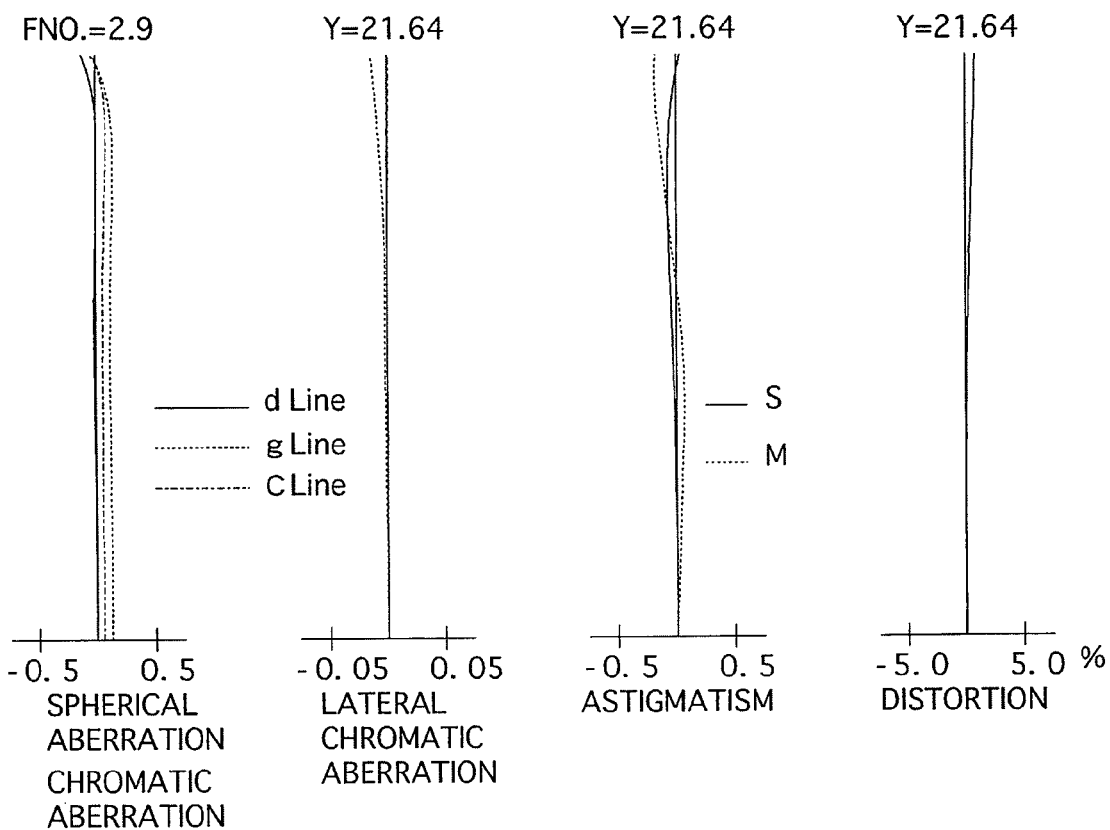
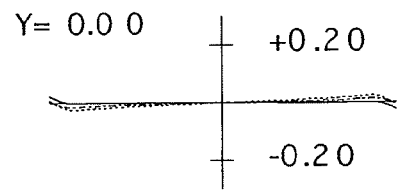
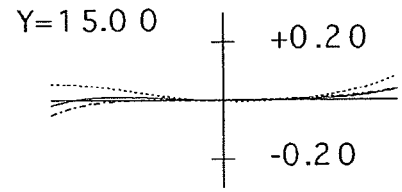
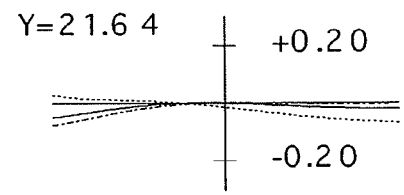

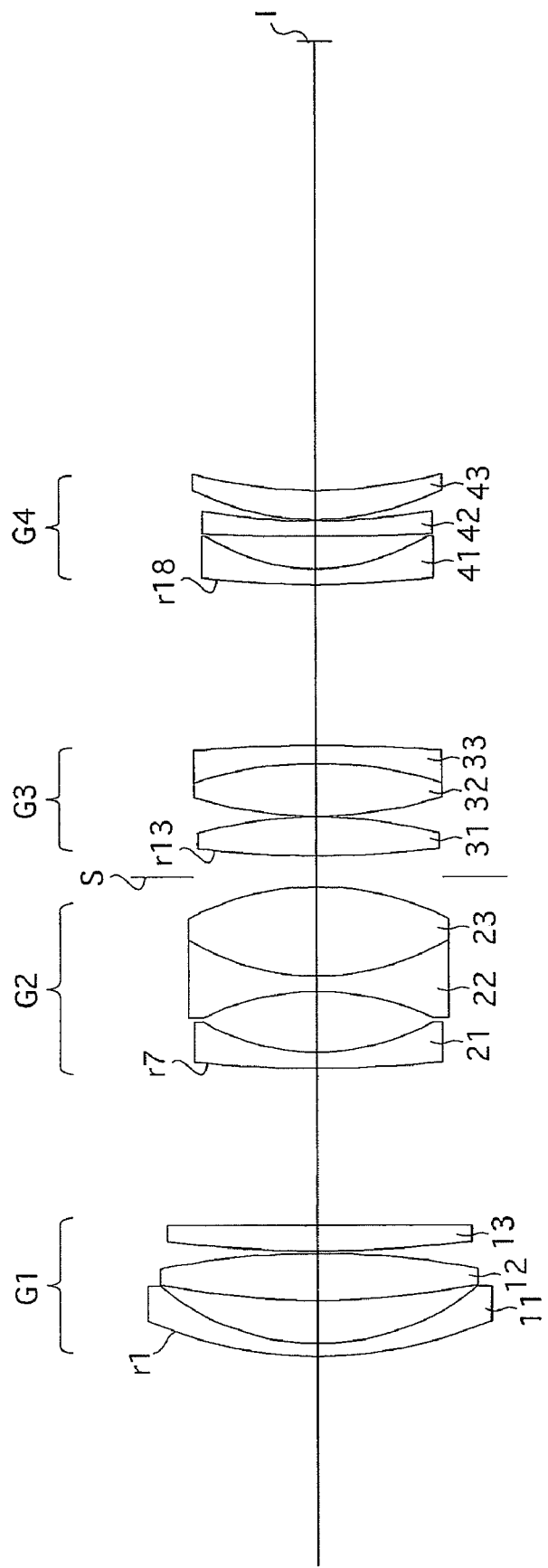

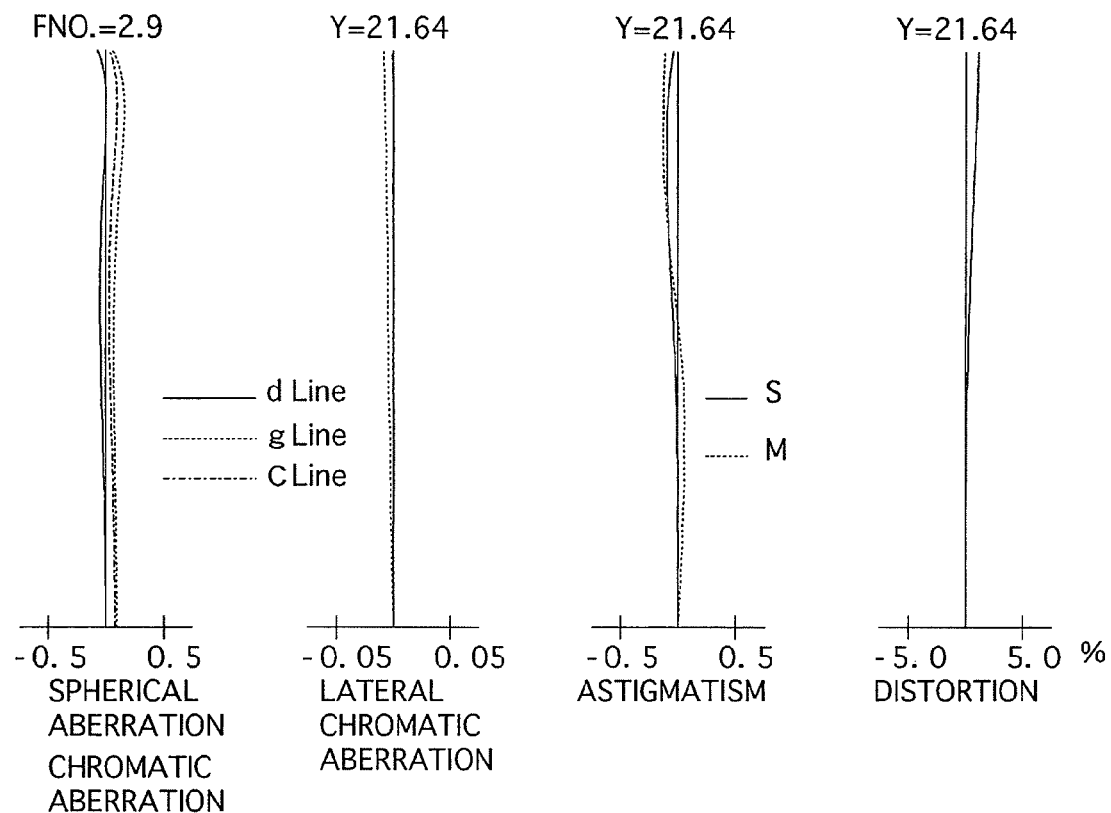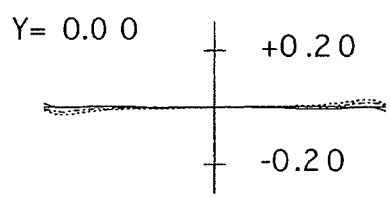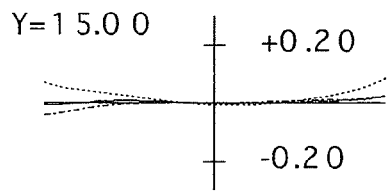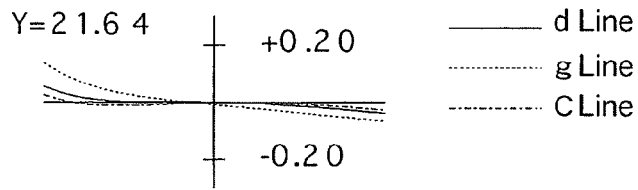

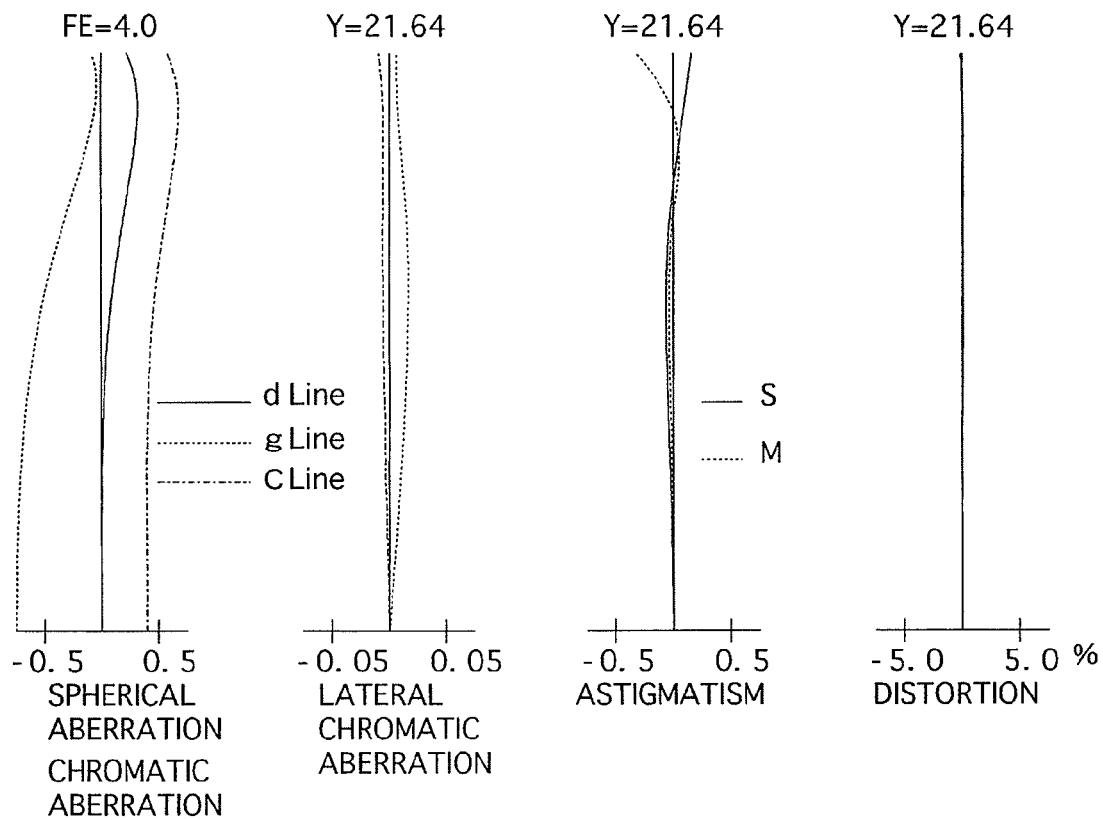
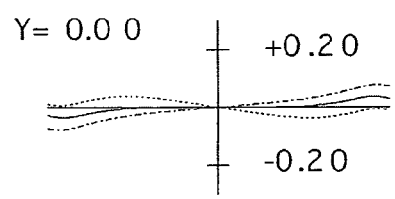
Fig. 48A
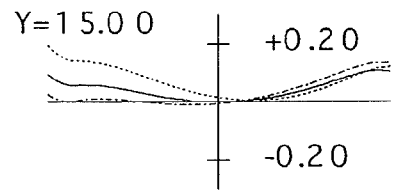
Fig. 48B
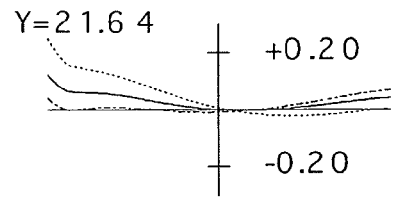
Fig. 48C

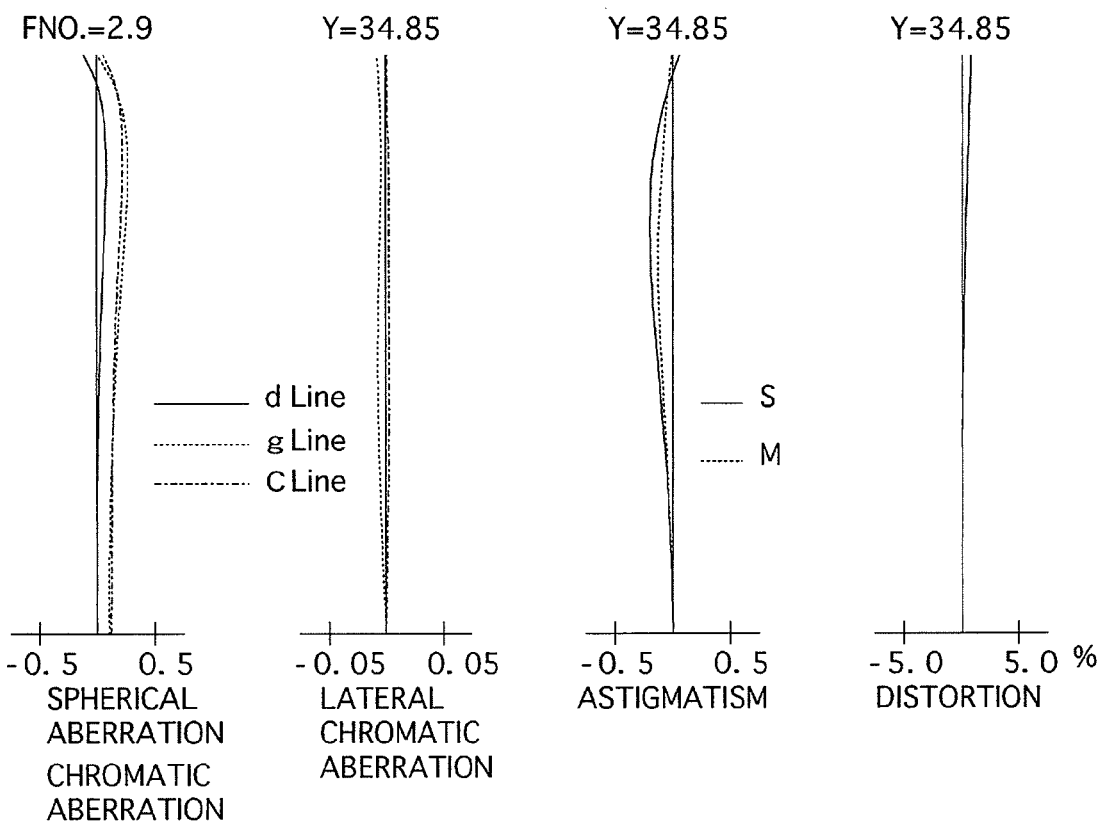
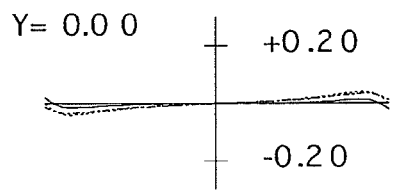
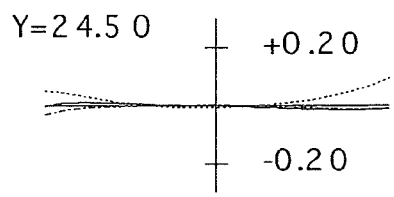
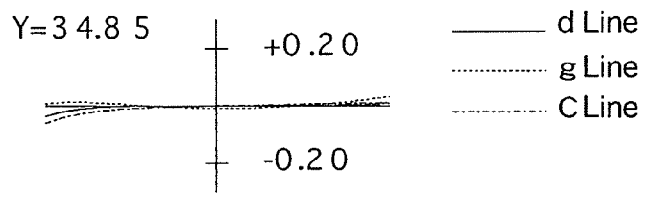

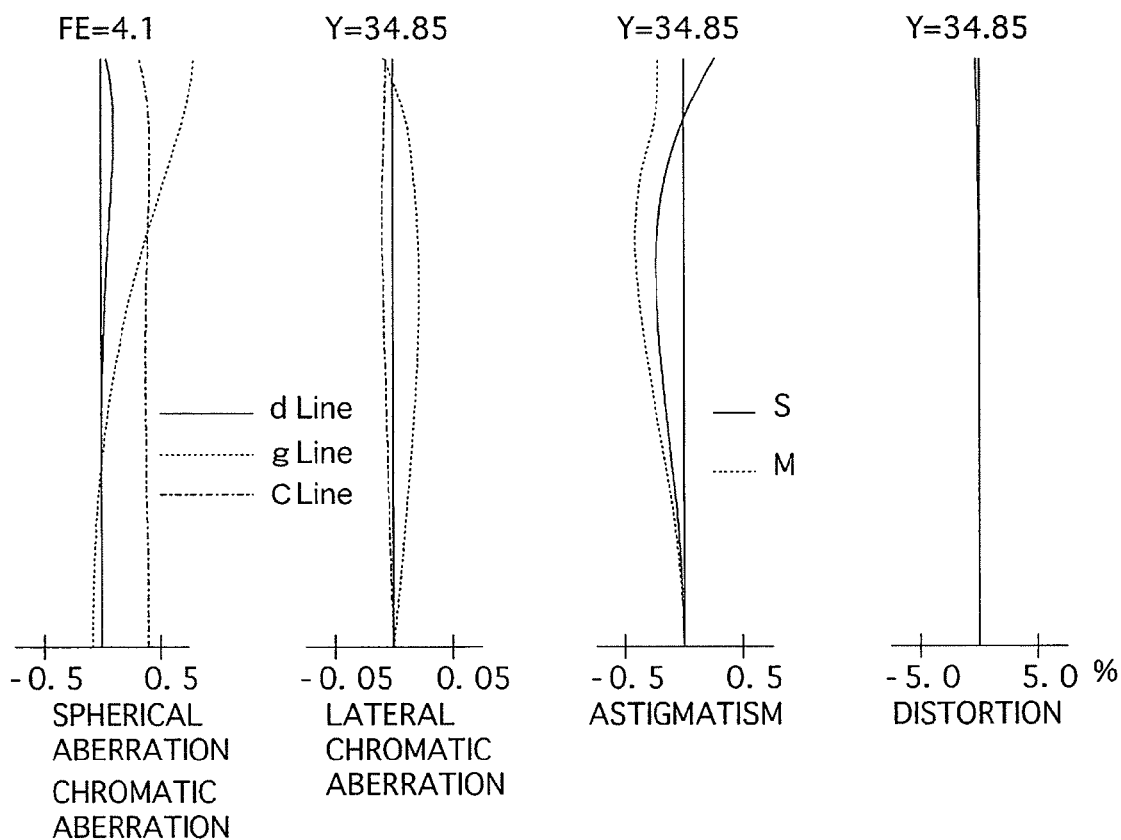
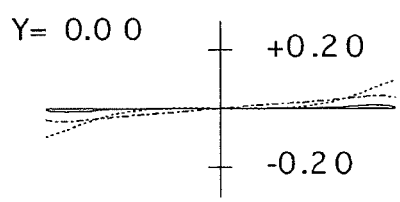
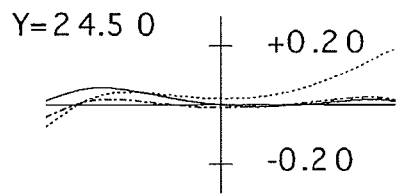
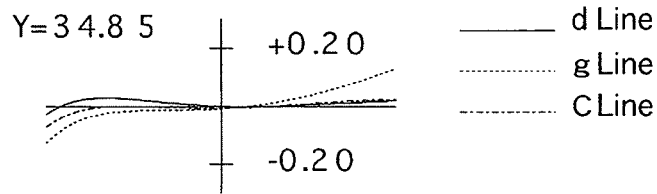

MACRO LENS SYSTEM

BACKGROUND OF THE INVENTION

1. Field of the Invention

The present invention relates to a macro lens system suitable for use in a medium-format single lens reflex (SLR) camera by which photography can be performed from an infinite photographic distance to the proximity of a life-sized photographic distance.

2. Description of Related Art

In the related art, a macro lens system for use in a photographic camera, etc. is known. With such a macro lens system, photography can be carried out at a photographic magnification of at least 0.5:1 or more. In a macro lens system in which the lens group (focusing lens group) provided closest to the object is moved along the optical axis direction during a focusing operation, the traveling distance of the focusing lens group is generally long, and hence, since the drive torque is large when used in an auto-focus camera, there is a tendency for a high-speed autofocusing operation being difficult to achieve. In a photographic lens for use in a medium-format camera in particular, since the lens diameter is large and is the weight of the photographic lens is heavy, the burden on the drive system therefor is great, which is undesirable.

Internal-focusing macro lens systems have been proposed as solutions to the above described problem (Japanese Unexamined Patent Publication Nos. 2008-257200 and 2004-61680). In such internal focusing macro lens systems, during a focusing operation, the first lens group that is provided closest to the object remains at a fixed position with respect to the imaging plane, and a plurality of lens groups other than the first lens group are independently moved along the optical axis direction, and by providing a negative lens element at the most object-side of the entire optical system (i.e., the most object-side of the first lens group), a back focal distance sufficiently long for a 35 mm-film-format SLR camera can be obtained while the correcting of various aberrations which occur over a wide photographic range from an infinite photographic distance to the proximity of a life-sized photographic distance is arranged to be performed.

However, in order to use either of the macro lens systems disclosed in Japanese Unexamined Patent Publication Nos. 2008-257200 and 2004-61680 in an apparatus which requires a long back focal distance with respect to the focal length, e.g., in a medium-format SLR camera, etc., it is difficult to achieve a wide angle-of-view by only enlarging (scaling up) the lens system, which also causes an increase in the overall length of the macro lens system. In other words, if either of the macro lens systems disclosed in Japanese Unexamined Patent Publication Nos. 2008-257200 and 2004-61680 is scaled up to a size for use in a medium-format camera with the angle-of-view remaining unchanged, the back focal distance becomes insufficient, and if either of these macro lens systems is further scaled up to a size which can achieve a sufficient back focal distance, the focal length becomes long (and hence, the angle-of-view narrows).

In order to attain a long back focal distance with respect to the focal length, it is effective to provide a negative lens element at the most object-side of the optical system (macro lens system; i.e., the most object-side of the first lens group). However, if an attempt is made to increase the absolute value of the refractive power of the most object-side negative lens element in order to attain a longer back focal distance, various aberrations such as negative spherical aberration, negative distortion, and positive field curvature, etc., occur. Consequently, it tends to be difficult to correct the various aberrations over the entire macro lens system.

SUMMARY OF THE INVENTION

The present invention is to provide an internal focus macro lens system for use especially in a medium-format SLR camera, which secures a long back focal distance while favorably correcting aberrations over a wide photographic range from an infinite photographic distance to the proximity of a life-sized photographic distance, has an angle-of-view of approximately 38 through 43 degrees, and reduces a burden on the autofocusing mechanism thereof.

According to an aspect of the present invention, there is provided a macro lens system including a positive first lens group, a negative second lens group, a positive third lens group, and a negative fourth lens group, in that order from the object.

Upon focusing from an infinite photographic distance to a life-sized photographic distance, the first lens group remains stationary with respect to the imaging plane, and the second and third lens groups move along the optical axis direction.

The macro lens system satisfies the following condition:

$$-4.6 < f_2/f_i < -3.0 \quad (1)$$

wherein $f_2$ designates the focal length of the second lens group; and $f_i$ designates the focal length of the entire the macro lens system when an object at infinity is in an in-focus state.

The macro lens system preferably satisfies the following condition:

$$-1.4 < f_{11}/f_i < -1.1 \quad (2)$$

wherein $f_{11}$ designates the focal length of the most object-side lens element of the first lens group; and $f_i$ designates the focal length of the entire the macro lens system when an object at infinity is in an in-focus state.

The macro lens system preferably satisfies the following conditions:

$$m_{1n} > 0 \quad (3)$$

$$m_{2n} > 0 \quad (4)$$

wherein $m_{1n}$ designates the lateral magnification of the first lens group when an object at a life-sized photographic distance is in an in-focus state; and $m_{2n}$ designates the lateral magnification of the second lens group when an object at a life-sized photographic distance is in an in-focus state.

The macro lens system preferably satisfies the following condition:

$$2.1 < m_{2i} < 2.5 \quad (5)$$

wherein $m_{2i}$ designates the lateral magnification of the second lens group when an object at infinity is in an in-focus state.

It is desirable for the fourth lens group to include two negative meniscus lens elements, each having the convex surface facing toward the object, and a positive meniscus lens element having the convex surface facing toward the object, in that order from the object, wherein an air-distance is defined between each lens element thereof.

According to another aspect of the present invention, there is provided a macro lens system including a positive first lens group, a negative second lens group, a positive third lens group, and a negative fourth lens group, in that order from the object.

Upon focusing from an infinite photographic distance to a life-sized photographic distance, the first lens group remains stationary with respect to the imaging plane, and the second and third lens groups move along the optical axis direction.

The fourth lens group includes two negative meniscus lens elements, each having the convex surface facing toward the object, and a positive meniscus lens element having the convex surface facing toward the object, in that order from the object, wherein an air-distance is defined between each lens element thereof.

According to the present invention, an internal focus macro lens system for use especially in a medium-format SLR camera can be attained. The internal focus macro lens system can secure a long back focal distance while favorably correcting aberrations over a wide photographic range from an infinite photographic distance to the proximity of a life-sized photographic distance, can attain an angle-of-view of approximately 38 through 43 degrees, and can reduce a burden on the autofocusing mechanism thereof.

The present disclosure relates to subject matter contained in Japanese Patent Application No. 2010-191680 (filed on Aug. 30, 2010) which is expressly incorporated herein in its entirety.

BRIEF DESCRIPTION OF THE DRAWINGS

The present invention will be discussed below in detail with reference to the accompanying drawings, in which:

FIG. 1 shows a lens arrangement of a first numerical embodiment of a macro lens system, according to the present invention, when an object at infinity is in an in-focus state;

FIG. 4 shows a lens arrangement of the first numerical embodiment when an object at a life-sized photographic distance is in an in-focus state;

FIGS. 5A, 5B, 5C and 5D show various aberrations of the lens arrangement shown in FIG. 4;

FIGS. 6A, 6B and 6C show lateral aberrations of the lens arrangement shown in FIG. 4;

FIG. 7 shows a lens arrangement of a second numerical embodiment of a macro lens system, according to the present invention, when an object at infinity is in an in-focus state;

FIGS. 11A, 11B, 11C and 11D show various aberrations of the lens arrangement shown in FIG. 10;

FIGS. 12A, 12B and 12C show lateral aberrations of the lens arrangement shown in FIG. 10;

FIGS. 14A, 14B, 14C and 14D show various aberrations of the lens arrangement shown in FIG. 13;

FIGS. 15A, 15B and 15C show lateral aberrations of the lens arrangement shown in FIG. 13;

FIGS. 23A, 23B, 23C and 23D show various aberrations of the lens arrangement shown in FIG. 22;

FIGS. 24A, 24B and 24C show lateral aberrations of the lens arrangement shown in FIG. 22;

FIGS. 32A, 32B, 32C and 32D show various aberrations of the lens arrangement shown in FIG. 31;

FIGS. 33A, 33B and 33C show lateral aberrations of the lens arrangement shown in FIG. 31;

FIG. 34 shows a lens arrangement of the sixth numerical embodiment when an object at a life-sized photographic distance is in an in-focus state;

FIGS. 35A, 35B, 35C and 35D show various aberrations of the lens arrangement shown in FIG. 34;

FIGS. 36A, 36B and 36C show lateral aberrations of the lens arrangement shown in FIG. 34;

FIG. 37 shows a lens arrangement of a seventh numerical embodiment of a macro lens system, according to the present invention, when an object at infinity is in an in-focus state;

FIGS. 38A, 38B, 38C and 38D show various aberrations of the lens arrangement shown in FIG. 37;

FIGS. 39A, 39B and 39C show lateral aberrations of the lens arrangement shown in FIG. 37;

FIG. 40 shows a lens arrangement of the seventh numerical embodiment when an object at a life-sized photographic distance is in an in-focus state;

FIGS. 44A, 44B, 44C and 44D show various aberrations of the lens arrangement shown in FIG. 43;

FIGS. 45A, 45B and 45C show lateral aberrations of the lens arrangement shown in FIG. 43;

FIGS. 47A, 47B, 47C and 47D show various aberrations of the lens arrangement shown in FIG. 46;

FIGS. 48A, 48B and 48C show lateral aberrations of the lens arrangement shown in FIG. 46;

FIGS. 50A, 50B, 50C and 50D show various aberrations of the lens arrangement shown in FIG. 49;

FIGS. 51A, 51B and 51C show lateral aberrations of the lens arrangement shown in FIG. 49;

FIGS. 53A, 53B, 53C and 53D show various aberrations of the lens arrangement shown in FIG. 52;

FIGS. 54A, 54B and 54C show lateral aberrations of the lens arrangement shown in FIG. 52.

DESCRIPTION OF THE EMBODIMENTS

Figure 55:
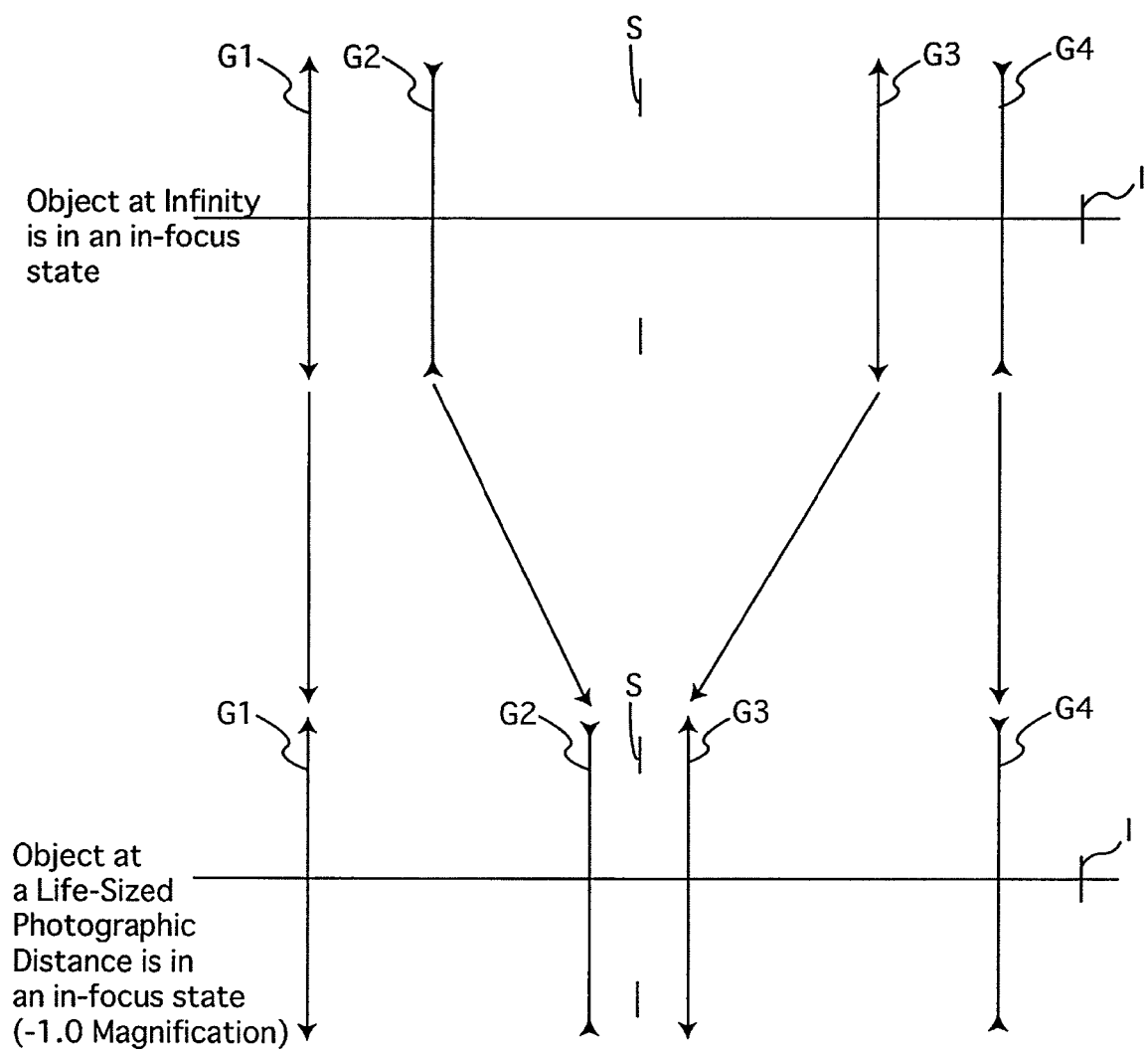
FIG. 55 shows lens-group moving paths of the macro lens system according to the present invention.

The macro lens system according to the present invention, as shown in the lens-group moving paths of FIG. 55, is configured of a positive first lens group G1, a negative second lens group G2, a positive third lens group G3, and a negative fourth lens group G4, in that order from the object. A diaphragm S which is disposed between the second lens group G2 and the third lens group G3 is stationary with respect to the imaging plane and does not move along the optical axis during a focusing operation. 'I' designates the imaging plane.

The macro lens system according to the present invention employs an internal focusing lens system in which, upon focusing from an infinite photographic distance (upper half of FIG. 55) to the life-sized photographic distance (lower half of FIG. 55), the first lens group G1 remains stationary with respect to the imaging plane I (i.e., the first lens group G1 does not move along the optical axis direction), the second lens group G2 moves toward the image, and the third lens group G3 moves toward the object. The fourth lens group G4, upon focusing from an infinite photographic distance to the life-sized photographic distance, can either remain stationary with respect to the imaging plane I (i.e., not move along the optical axis direction) or move along the optical axis direction.

In each of the first, second and fourth through ninth numerical embodiments, the first lens group G1 is configured of a negative lens element 11, a positive lens element 12 and a positive lens element 13, in that order from the object.

In the third numerical embodiment, the first lens group G1 is configured of a negative lens element 11', a positive lens element 12', a positive lens element 13' and a positive lens element 14', in that order from the object.

In each of the first through ninth numerical embodiments, the second lens group G2 is configured of a negative lens element 21, and a cemented lens formed by a negative lens element 22 and a positive lens element 23, in that order from the object.

In each of the first through ninth numerical embodiments, the third lens group G3 is configured of a positive lens element 31, and a cemented lens formed by a positive lens element 32 and a negative lens element 33, in that order from the object.

In each of the first through ninth numerical embodiments, the fourth lens group G4 is configured of a negative lens element 41, a negative lens element 42 and a positive lens element 43, in that order from the object.

In an internal-focusing macro lens system which can be used in an SLR camera, in order to attain a sufficiently long back focal distance while reducing aberration fluctuations that occur over a wide photographic range from an infinite photographic distance to the proximity of a life-sized photographic distance, it is necessary to appropriately distribute the refractive power over the second lens group G2 and the most object-side lens element (11) of the first lens group G1. The second lens group G2 has a negative refractive power and constitutes a focusing lens group.

Condition (1) specifies the ratio of the focal length of the second lens group G2 to that of the entire macro lens system when an object at infinity is in an in-focus state, and is for achieving a sufficiently long back focal distance while the correcting of aberrations is favorably done over a wide photographic range from an infinite photographic distance to the proximity of a life-sized photographic distance.

If the upper limit of condition (1) is exceeded, the negative refractive power of the second lens group G2 constituting a focusing lens group becomes too strong, so that it becomes difficult to reduce changes in spherical aberration, which occur during focusing.

If the lower limit of condition (1) is exceeded, it is advantageous to correct aberrations; however, the traveling distance of the second lens group G2 along the optical axis direction becomes too long, which increases the burden on the autofocusing mechanism. Furthermore, when attempts are made to secure a working distance at a life-sized photographic distance, the overall length of the macro lens system undesirably increases.

Condition (2) specifies the ratio of the focal length of the most object-side lens element of the first lens group G1 to the focal length of the entire macro lens system when an object at infinity is in an in-focus state, and is for achieving a sufficiently long back focal distance while the correcting of aberrations is favorably done over a wide photographic range from an infinite photographic distance to the proximity of a life-sized photographic distance.

If the upper limit of condition (2) is exceeded, the negative refractive power of the most object-side lens element of the first lens group G1 becomes too strong, so that the correcting of distortion and astigmatism becomes difficult.

If the lower limit of condition (2) is exceeded, it is advantageous to correct aberrations; however, the overall length of the macro lens system increases and the diameters of the first lens group G1 and the second lens group G2 increase in order to collect a sufficient amount of illumination, which causes an increase in costs. Furthermore, the weight of the movable lens groups increases, which results in an increased burden on the autofocusing mechanism.

Condition (3) specifies the lateral magnification of the first lens group G1 to be a positive value when an object at a life-sized photographic distance is in an in-focus state, and condition (4) specifies the lateral magnification of the second lens group G2 to be a positive value when an object at a life-sized photographic distance is in an in-focus state. Conditions (3) and (4) are for reducing occurrence of spherical aberration by gently bending the axial light rays.

When light rays emitted from an object at a close-distance are bent by the positive first lens group G1 and the negative second lens group G2, the lateral magnifications of the first lens group G1 and the second lens group G2 either are both positive lateral magnifications or both negative lateral magnifications. In the latter case, i.e., in the case where conditions (3) and (4) are not satisfied, the axial light rays as divergent light rays incident on the first lens group G1 becomes converged light rays via the first lens group G1, and the converged light rays become divergent light rays again via the second lens group G2. Hence, when the axial light rays repetitively converge and diverge, a large amount of spherical aberration undesirably occurs.

Condition (5) specifies the lateral magnification of the second lens group G2 when an object at infinity is in an in-focus state, is for reducing aberration fluctuations which occur during focusing, and is for reducing the traveling distance of the second lens group G2 in order to reduce the burden on the autofocusing mechanism.

If the upper limit of condition (5) is exceeded, the refractive power of the second lens group G2 constituting a focusing lens group becomes too strong, so that it becomes difficult to reduce changes in spherical aberration that occur during focusing.

If the lower limit of condition (5) is exceeded, it is advantageous to correct aberrations; however, the traveling distance of the second lens group G2 along the optical axis direction becomes too long which results in an increased burden on the autofocusing mechanism.

Furthermore, in the macro lens system of the present invention, the fourth lens group G4 is configured of three lens elements, i.e., two negative meniscus lens elements, each having the convex surface facing toward the object, and a positive meniscus lens element having the convex surface facing toward the object, in that order from the object, wherein an air-distance is defined between each lens element thereof.

By configuring the fourth lens group G4, which has a negative refractive power, so as to have a combination of two negative lens elements on the object side and one positive lens element on the image side, various aberrations, such as off-axis coma, chromatic aberration and field curvature, can be corrected. Furthermore, by providing an air-distance between each of these lens elements without bonding the negative lens elements on the object side to the positive lens element on the image side to otherwise form a cemented lens, various aberrations, such as off-axis coma and astigmatism, can be more favorably and more easily corrected. Moreover, by providing each of the three lens elements of the fourth lens group G4 with the convex surface on the object side, the incidence angle of the axial light rays, that have been converged by the third lens group G3, on each convex surface becomes smaller (gentler), and occurrence of higher order spherical aberration can be favorably reduced.

[Embodiments]

Specific numerical embodiments will be herein discussed. In the aberration diagrams, lateral aberration diagrams and the tables, the d-line, g-line and C-line show aberrations at their respective wave-lengths; S designates the sagittal image, M designates the meridional image, Fno. designates the f-number, FE designates the effective f-number, f designates the focal length of the entire optical system, W designates the half angle of view (°), Y designates the image height, fB designates the back focal distance, L designates the overall length of the lens system, r designates the radius of curvature, d designates the lens thickness or distance between lenses, N(d) designates the refractive index at the d-line, and vd designates the Abbe number at the d-line. With respect to an aspherical coefficient, "E-a" designates "x $10^{-a}$".

The values for the f-number, the effective f-number, the focal length, the half angle-of-view, the image height, the back focal distance, the overall length of the lens system, and the distance 'd' between lenses (which changes during focusing) are shown in the following order: infinite photographic state and life-sized (−1.0:1) photographic state.

An aspherical surface which is rotationally symmetrical about the optical axis is defined as:

$$x=cy^2/(1+[1-\{1+K\}c^2y^2]^{1/2})+A4y^4+A6y^6+A8y^8+A10y^{10}+A12y^{12}\ldots$$

wherein 'x' designates a distance from a tangent plane of the aspherical vertex, 'c' designates the curvature (1/r) of the aspherical vertex, 'y' designates the distance from the optical axis, 'K' designates the conic coefficient, A4 designates a fourth-order aspherical coefficient, A6 designates a sixth-order aspherical coefficient, A8 designates an eighth-order aspherical coefficient, A10 designates a tenth-order aspherical coefficient, and A12 designates a twelfth-order aspherical coefficient.

[Numerical Embodiment 1]

FIGS. 1 through 6C and Tables 1 through 3 show a first numerical embodiment of the macro lens system, according to the present invention, when an object at infinity is in an in-focus state. FIGS. 2A, 2B, 2C and 2D show various aberrations of the lens arrangement shown in FIG. 1. FIGS. 3A, 3B and 3C show lateral aberrations of the lens arrangement shown in FIG. 1. FIG. 4 shows a lens arrangement of the first numerical embodiment when an object at a life-sized photographic distance is in an in-focus state. FIGS. 5A, 5B, 5C and 5D show various aberrations of the lens arrangement shown in FIG. 4. FIGS. 6A, 6B and 6C show lateral aberrations of the lens arrangement shown in FIG. 4. Table 1 shows the lens surface data, Table 2 shows various lens system data, and Table 3 shows the aspherical surface data.

The macro lens system of the first numerical embodiment is configured of a positive first lens group G1, a negative second lens group G2, a positive third lens group G3 and a negative fourth lens group G4, in that order from the object.

The first lens group G1 (surface Nos. 1 through 7) is configured of a negative meniscus lens element 11 having the convex surface facing toward the object, a biconvex lens element 12, and a positive meniscus lens element 13 having the convex surface facing toward the object, in that order from the object. The negative meniscus lens element 11 is a hybrid lens element having an aspherical layer formed of a compound resin material bonded onto the image-side surface of a glass lens element.

The second lens group G2 (surface Nos. 8 through 12) is configured of a negative meniscus lens element 21 having the convex surface facing toward the object, and a cemented lens formed by a biconcave negative lens element 22 and a biconvex positive lens element 23, in that order from the object.

The third lens group G3 (surface Nos. 14 through 18) is configured of a biconvex positive lens element 31, and a cemented lens formed by a biconvex positive lens element 32 and a negative meniscus lens element 33 having the convex surface facing toward the image, in that order from the object.

The fourth lens group G4 (surface Nos. 19 through 24) is configured of a negative meniscus lens element 41 having the convex surface facing toward the object, a negative meniscus lens element 42 having the convex surface facing toward the object, and a positive meniscus lens element 43 having the convex surface facing toward the object, in that order from the object.

The diaphragm S (surface No. 13) that is provided between the second lens group G2 and the third lens group G3 is stationary (i.e., does not move along the optical axis direction) with respect to the imaging plane I.

TABLE 1

SURFACE DATA

| Surf. No. | r | d | N(d) | vd |
|---|---|---|---|---|
| 1 | 55.123 | 2.800 | 1.83481 | 42.7 |
| 2 | 32.887 | 0.200 | 1.52972 | 42.7 |
| 3* | 33.171 | 15.376 | | |
| 4 | 699.593 | 4.885 | 1.72916 | 54.7 |
| 5 | −111.360 | 0.598 | | |
| 6 | 64.628 | 5.547 | 1.60311 | 60.7 |
| 7 | 712.985 | d7 | | |
| 8 | 5081.191 | 1.800 | 1.56384 | 60.8 |
| 9 | 41.787 | 8.561 | | |
| 10 | −46.495 | 2.864 | 1.70154 | 41.2 |
| 11 | 46.802 | 12.662 | 1.83481 | 42.7 |
| 12 | −47.158 | d12 | | |
| 13(Diaphragm) | ∞ | d13 | | |
| 14 | 227.574 | 5.068 | 1.49700 | 81.6 |
| 15 | −69.143 | 0.100 | | |
| 16 | 71.760 | 6.853 | 1.58913 | 61.2 |
| 17 | −66.740 | 3.588 | 1.84666 | 23.8 |
| 18 | −825.523 | d18 | | |
| 19 | 209.910 | 2.579 | 1.72342 | 38.0 |
| 20 | 44.996 | 2.602 | | |
| 21 | 130.425 | 1.900 | 1.60311 | 60.7 |
| 22 | 49.011 | 2.134 | | |
| 23 | 50.187 | 4.266 | 1.80518 | 25.5 |
| 24 | 132.716 | — | | |

The asterisk (*) designates an aspherical surface which is rotationally symmetrical with respect to the optical axis.

TABLE 2

LENS SYSTEM DATA

| | Infinite Photographic State | Life-Sized (−1.0:1) Photographic State |
|---|---|---|
| FNO. (FE) | 2.9 | (4.2) |
| f | 87.80 | 58.80 |
| W | 21.5 | 14.6 |
| Y | 34.85 | 34.85 |
| fB | 67.93 | 67.93 |
| L | 205.94 | 205.94 |
| d7 | 4.000 | 19.053 |
| d12 | 16.653 | 1.600 |
| d13 | 30.475 | 3.350 |
| d18 | 2.500 | 29.625 |

TABLE 3

Aspherical Surface Data (the aspherical surface coefficients not indicated are zero (0.00)):

| Surf. No. | κ | A4 | A6 | A8 |
|---|---|---|---|---|
| 3 | 0.000 | 0.3350E−06 | 0.1236E−10 | −0.2339E−12 |

[Numerical Embodiment 2]

Figure 2A:
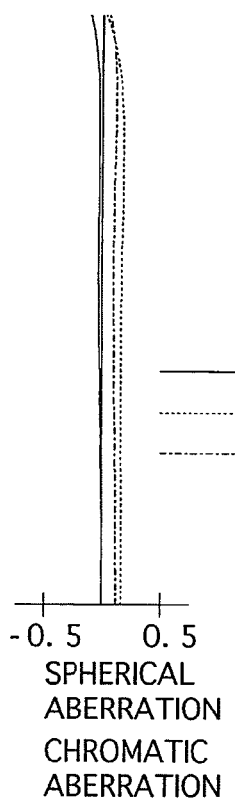
FIGS. 2A, 2B, 2C and 2D show various aberrations of the lens arrangement shown in FIG. 1.
Figure 2B:
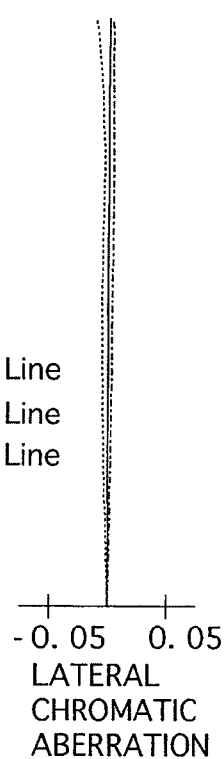
Figure 2C:
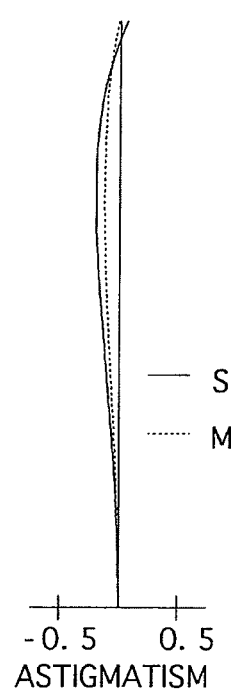
Figure 2D:
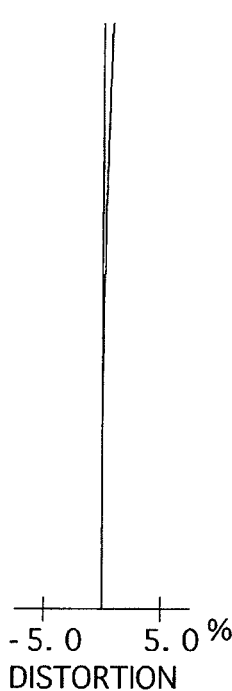
Figure 3A:
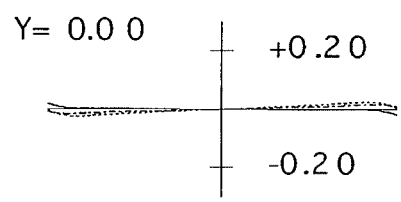
FIGS. 3A, 3B and 3C show lateral aberrations of the lens arrangement shown in FIG. 1.
Figure 3B:
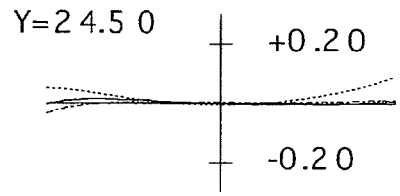
Figure 3C:
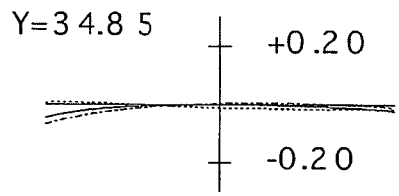
Figure 8A:
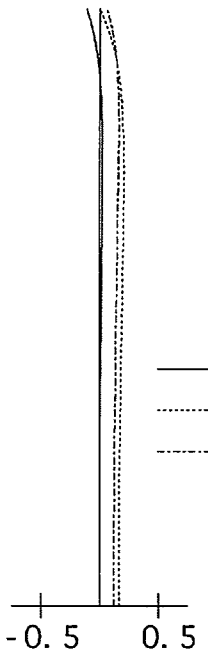
FIGS. 8A, 8B, 8C and 8D show various aberrations of the lens arrangement shown in FIG. 7.
Figure 8B:
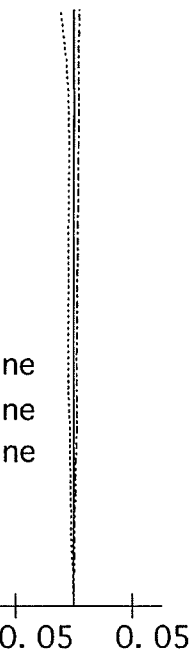
Figure 8C:
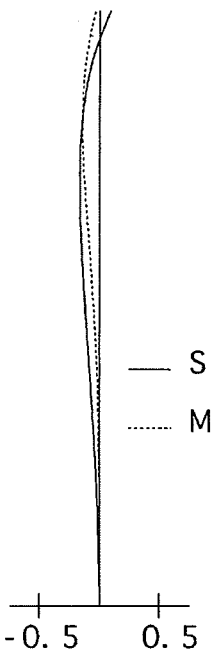
Figure 8D:
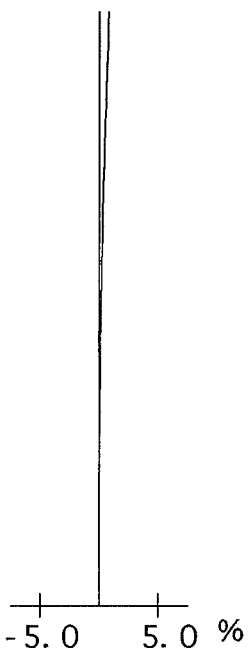
Figure 9A:
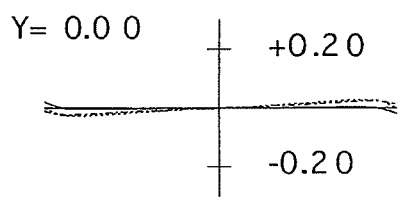
FIGS. 9A, 9B and 9C show lateral aberrations of the lens arrangement shown in FIG. 7.
Figure 9B:
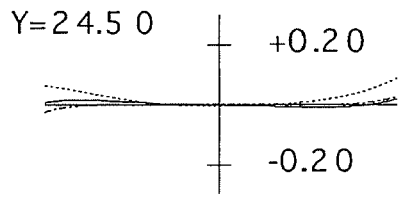
Figure 9C:
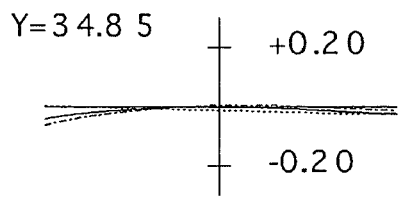
Figure 10:
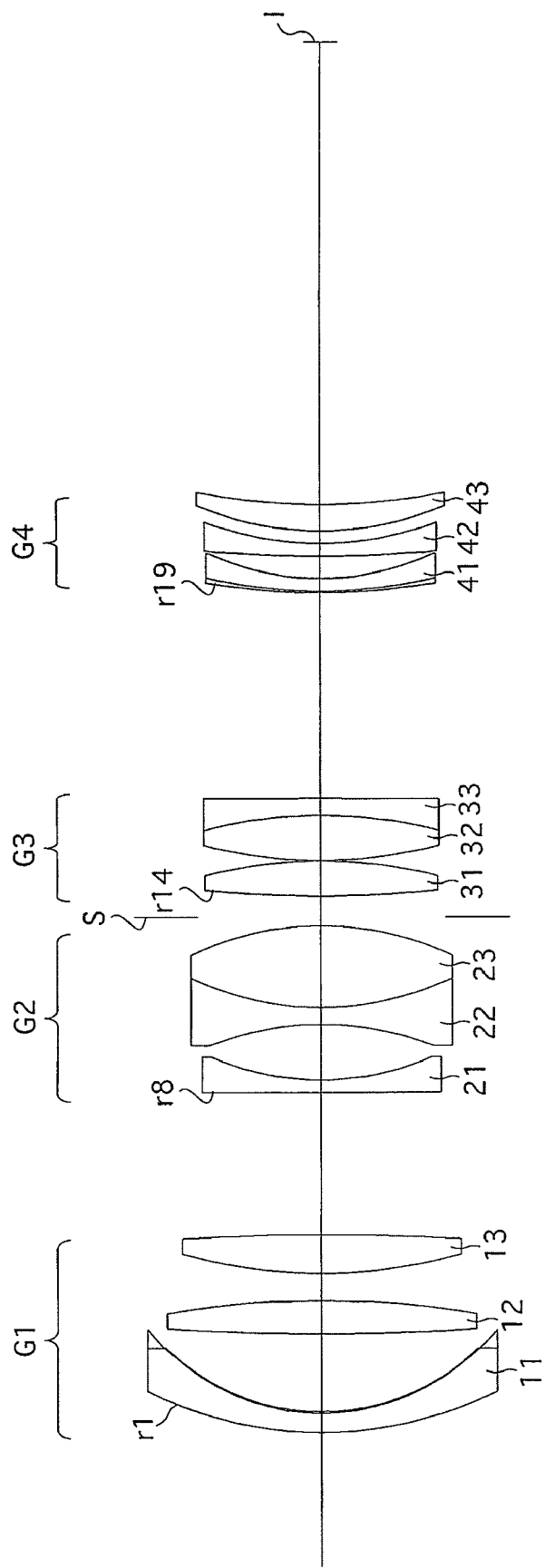
FIG. 10 shows a lens arrangement of the second numerical embodiment when an object at a life-sized photographic distance is in an in-focus state.

FIGS. 7 through 12C and Tables 4 through 6 show a second numerical embodiment of the macro lens system according to the present invention. FIG. 7 shows a lens arrangement of the second numerical embodiment of a macro lens system, according to the present invention, when an object at infinity is in an in-focus state. FIGS. 8A, 8B, 8C and 8D show various aberrations of the lens arrangement shown in FIG. 7. FIGS. 9A, 9B and 9C show lateral aberrations of the lens arrangement shown in FIG. 7. FIG. 10 shows a lens arrangement of the second numerical embodiment when an object at a life-sized photographic distance is in an in-focus state. FIGS. 11A, 11B, 11C and 11D show various aberrations of the lens arrangement shown in FIG. 10. FIGS. 12A, 12B and 12C show lateral aberrations of the lens arrangement shown in FIG. 10. Table 4 shows the lens surface data, Table 5 shows various lens system data, and Table 6 shows the aspherical surface data.

The lens arrangement of the second numerical embodiment is the same as that of the first numerical embodiment except for the aspects mentioned hereinbelow.

(1) The positive lens element 13 of the first lens group G1 is a biconvex positive lens element.

(2) The negative lens element 21 of the second lens group G2 is a biconcave negative lens element.

(3) The negative lens element 41 of the fourth lens group G4 is a hybrid lens element having an aspherical layer formed of a compound resin material bonded onto the object-side surface of a glass lens element.

TABLE 4

SURFACE DATA

| Surf. No. | r | d | N(d) | vd |
|---|---|---|---|---|
| 1 | 60.691 | 2.800 | 1.83481 | 42.7 |
| 2 | 34.055 | 0.200 | 1.52972 | 42.7 |
| 3* | 34.313 | 11.740 | | |
| 4 | 392.420 | 4.850 | 1.72916 | 54.7 |
| 5 | −142.500 | 3.940 | | |
| 6 | 79.022 | 5.740 | 1.60311 | 60.7 |
| 7 | −369.600 | d7 | | |
| 8 | −3173.773 | 1.800 | 1.56384 | 60.8 |
| 9 | 43.000 | 8.290 | | |
| 10 | −46.311 | 2.500 | 1.70154 | 41.2 |
| 11 | 46.311 | 12.260 | 1.83481 | 42.7 |
| 12 | −46.311 | d12 | | |
| 13(Diaphragm) | ∞ | d13 | | |
| 14 | 181.168 | 5.170 | 1.49700 | 81.6 |
| 15 | −71.400 | 0.100 | | |
| 16 | 71.400 | 6.690 | 1.58913 | 61.2 |
| 17 | −71.400 | 2.590 | 1.84666 | 23.8 |
| 18 | −2264.952 | d18 | | |
| 19* | 104.493 | 0.200 | 1.52972 | 42.7 |
| 20 | 78.389 | 1.900 | 1.72342 | 38.0 |
| 21 | 41.300 | 3.310 | | |
| 22 | 200.336 | 1.900 | 1.60311 | 60.7 |
| 23 | 50.922 | 1.830 | | |
| 24 | 47.859 | 4.000 | 1.80518 | 25.5 |
| 25 | 98.790 | — | | |

The asterisk (*) designates an aspherical surface which is rotationally symmetrical with respect to the optical axis.

TABLE 5

LENS SYSTEM DATA

| | Infinite Photographic State | Life-Sized (−1.0:1) Photographic State |
|---|---|---|
| FNO. (FE) | 2.9 | (4.2) |
| f | 87.80 | 58.76 |
| W | 21.5 | 14.7 |
| Y | 34.85 | 34.85 |
| fB | 67.96 | 67.96 |
| L | 205.93 | 205.93 |
| d7 | 5.040 | 21.116 |
| d12 | 17.300 | 1.224 |
| d13 | 31.320 | 3.194 |
| d18 | 2.500 | 30.626 |

TABLE 6

Aspherical Surface Data (the aspherical surface coefficients not indicated are zero (0.00)):

| Surf. No. | κ | A4 | A6 | A8 |
|---|---|---|---|---|
| 3 | 0.000 | 0.4167E−06 | −0.6200E−10 | −0.2212E−12 |
| 19 | 0.000 | −0.4069E−06 | 0.3096E−09 | −0.9349E−12 |

[Numerical Embodiment 3]

Figure 13:
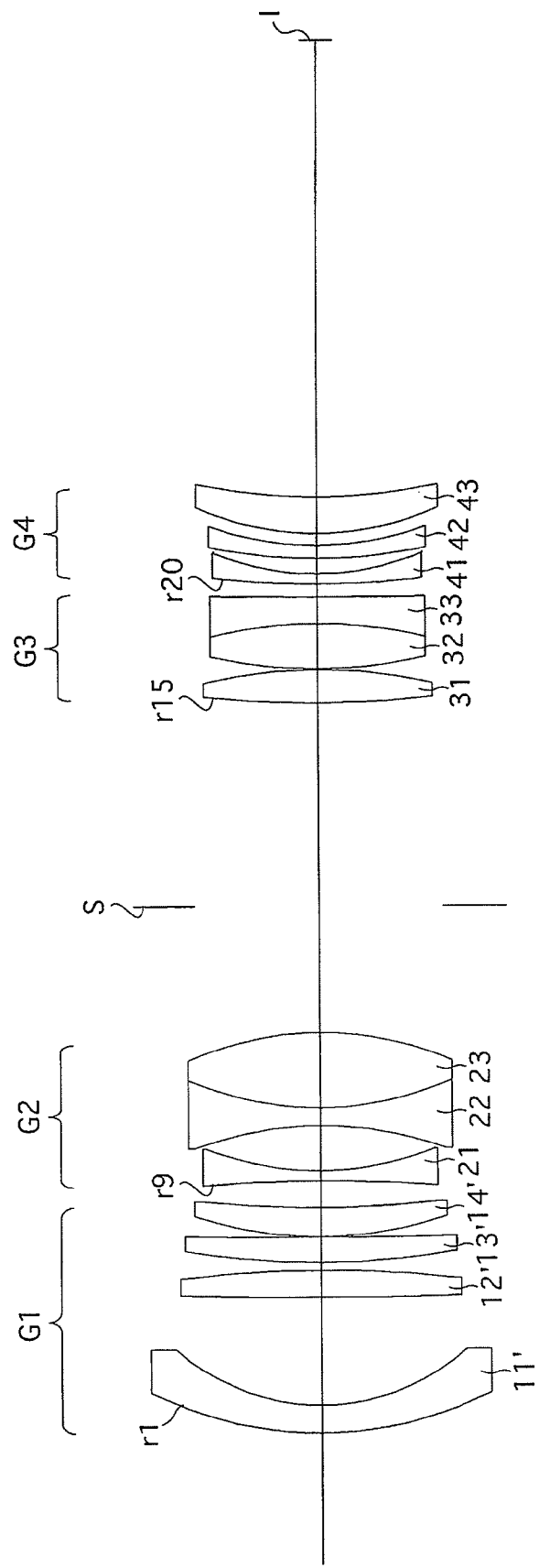
FIG. 13 shows a lens arrangement of a third numerical embodiment of a macro lens system, according to the present invention, when an object at infinity is in an in-focus state.
Figure 16:
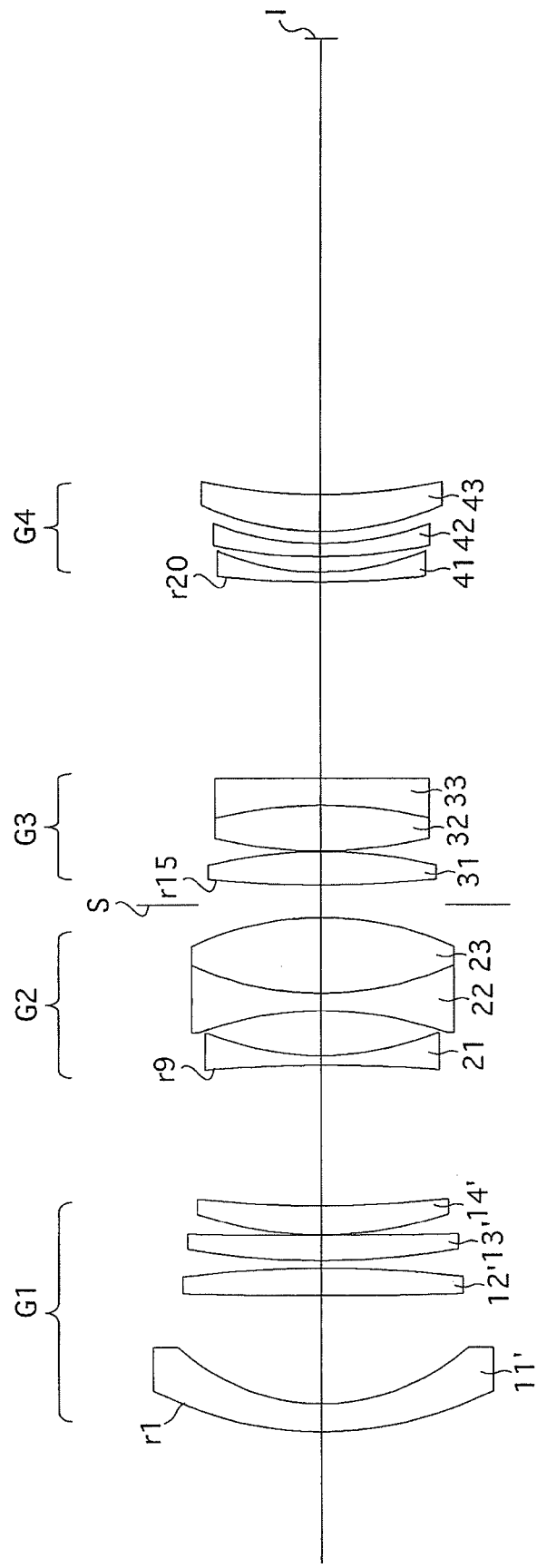
FIG. 16 shows a lens arrangement of the third numerical embodiment when an object at a life-sized photographic distance is in an in-focus state.
Figures 17A, 17B, 17C, 17D:
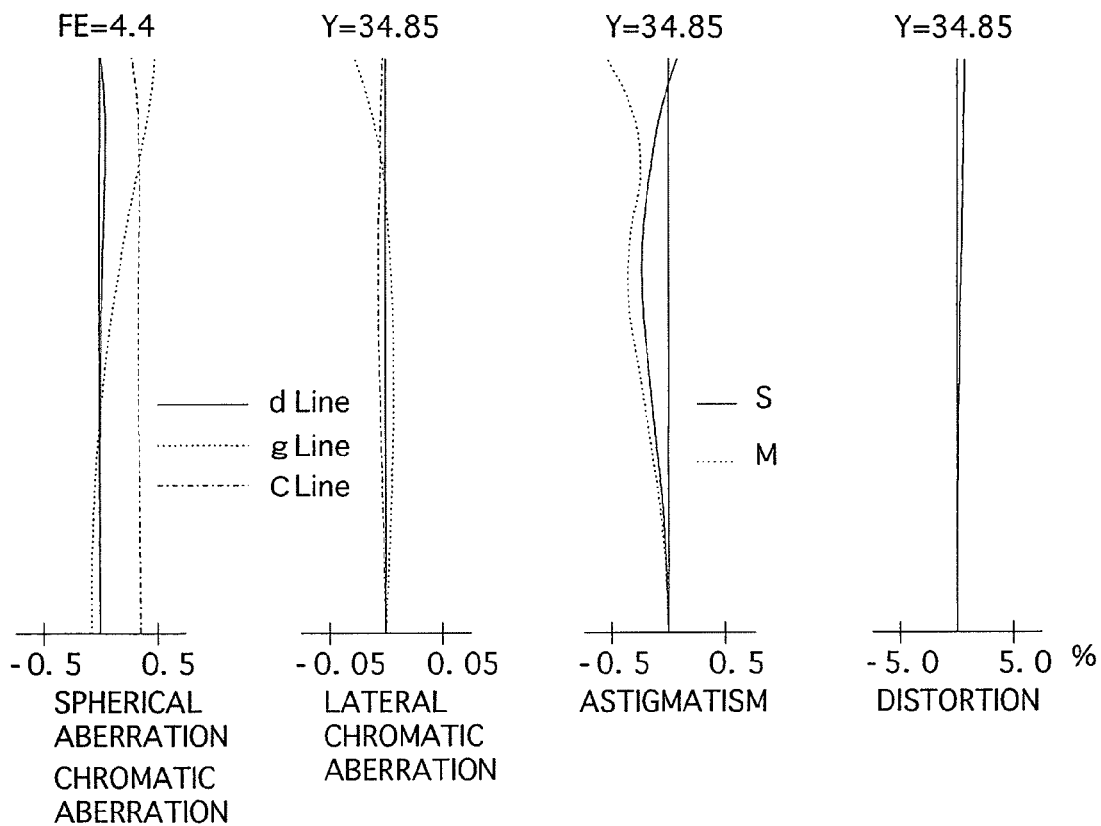
FIGS. 17A, 17B, 17C and 17D show various aberrations of the lens arrangement shown in FIG. 16.
Figure 18A:
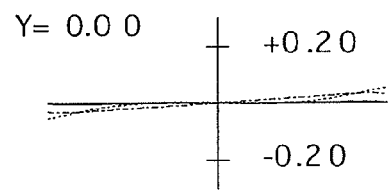
FIGS. 18A, 18B and 18C show lateral aberrations of the lens arrangement shown in FIG. 16.
Figure 18B:
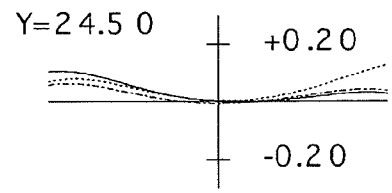
Figure 18C:
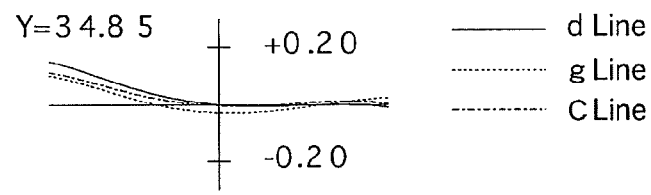

FIGS. 13 through 18C and Tables 7 and 8 show a third numerical embodiment of the macro lens system according to the present invention. FIG. 13 shows a lens arrangement of the third numerical embodiment of a macro lens system, according to the present invention, when an object at infinity is in an in-focus state. FIGS. 14A, 14B, 14C and 14D show various aberrations of the lens arrangement shown in FIG. 13. FIGS. 15A, 15B and 15C show lateral aberrations of the lens arrangement shown in FIG. 13. FIG. 16 shows a lens arrangement of the third numerical embodiment when an object at a life-sized photographic distance is in an in-focus state. FIGS. 17A, 173, 17C and 17D show various aberrations of the lens arrangement shown in FIG. 16. FIGS. 18A, 18B and 18C show lateral aberrations of the lens arrangement shown in FIG. 16. Table 7 shows the lens surface data and Table 8 shows various lens system data.

The lens arrangement of the third numerical embodiment is the same as that of the first numerical embodiment except for the aspects mentioned hereinbelow.

(1) The first lens group G1 is configured of a negative meniscus lens element 11' having the convex surface facing toward the object, a biconvex positive lens element 12', a positive meniscus lens element 13' having the convex surface facing toward the object, and a positive meniscus lens element 14' having the convex surface facing toward the object, in that order from the object.

(2) The negative lens element 33 of the third lens group G3 is a biconcave negative lens element.

TABLE 7

SURFACE DATA

| Surf. No. | r | d | N(d) | νd |
|---|---|---|---|---|
| 1 | 58.475 | 4.200 | 1.83400 | 37.3 |
| 2 | 33.521 | 16.359 | | |
| 3 | 826.773 | 4.048 | 1.80420 | 46.5 |
| 4 | −189.499 | 1.165 | | |
| 5 | 127.303 | 3.745 | 1.72916 | 54.7 |
| 6 | 1173.435 | 0.100 | | |
| 7 | 61.131 | 4.369 | 1.48749 | 70.4 |
| 8 | 176.636 | d8 | | |
| 9 | −236.104 | 1.500 | 1.65100 | 56.2 |
| 10 | 47.633 | 6.757 | | |
| 11 | −56.188 | 2.700 | 1.63980 | 34.6 |
| 12 | 49.654 | 11.371 | 1.83400 | 37.3 |
| 13 | −49.586 | d13 | | |
| 14(Diaphragm) | ∞ | d14 | | |
| 15 | 169.303 | 5.062 | 1.49700 | 81.6 |
| 16 | −75.857 | 0.100 | | |
| 17 | 71.420 | 6.892 | 1.61800 | 63.4 |
| 18 | −70.655 | 4.000 | 1.84666 | 23.8 |
| 19 | 2036.631 | d19 | | |
| 20 | 147.175 | 1.500 | 1.74400 | 44.9 |
| 21 | 41.197 | 2.339 | | |
| 22 | 81.525 | 2.000 | 1.69680 | 55.5 |
| 23 | 48.057 | 1.828 | | |
| 24 | 45.627 | 5.545 | 1.80518 | 25.5 |
| 25 | 88.884 | — | | |

TABLE 8

LENS SYSTEM DATA

| | Infinite Photographic State | Life-Sized (−1.0:1) Photographic State |
|---|---|---|
| FNO. (FE) | 2.9 | (4.4) |
| f | 88.00 | 58.40 |
| W | 21.6 | 14.9 |
| Y | 34.85 | 34.85 |
| fB | 67.99 | 67.99 |
| L | 209.30 | 209.30 |
| d8 | 4.000 | 21.141 |
| d13 | 19.052 | 1.911 |
| d14 | 30.688 | 3.000 |
| d19 | 2.000 | 29.688 |

[Numerical Embodiment 4]

Figure 19:
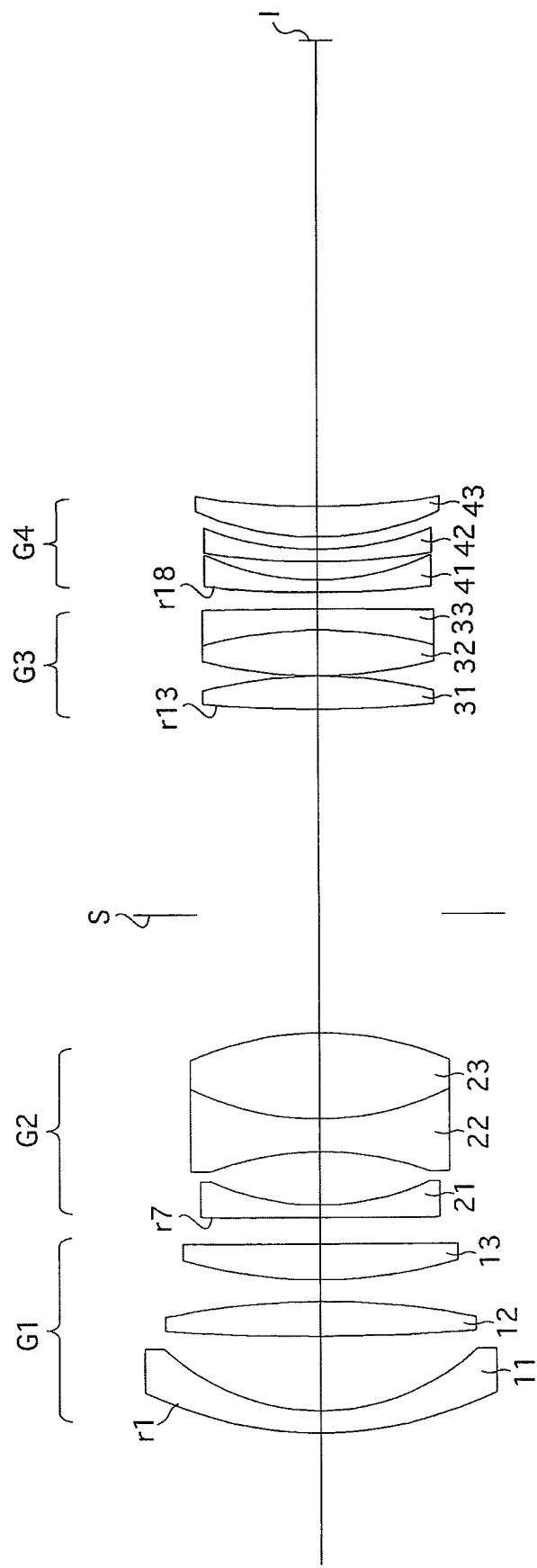
FIG. 19 shows a lens arrangement of a fourth numerical embodiment of a macro lens system, according to the present invention, when an object at infinity is in an in-focus state.
Figures 20A, 20B, 20C, 20D:
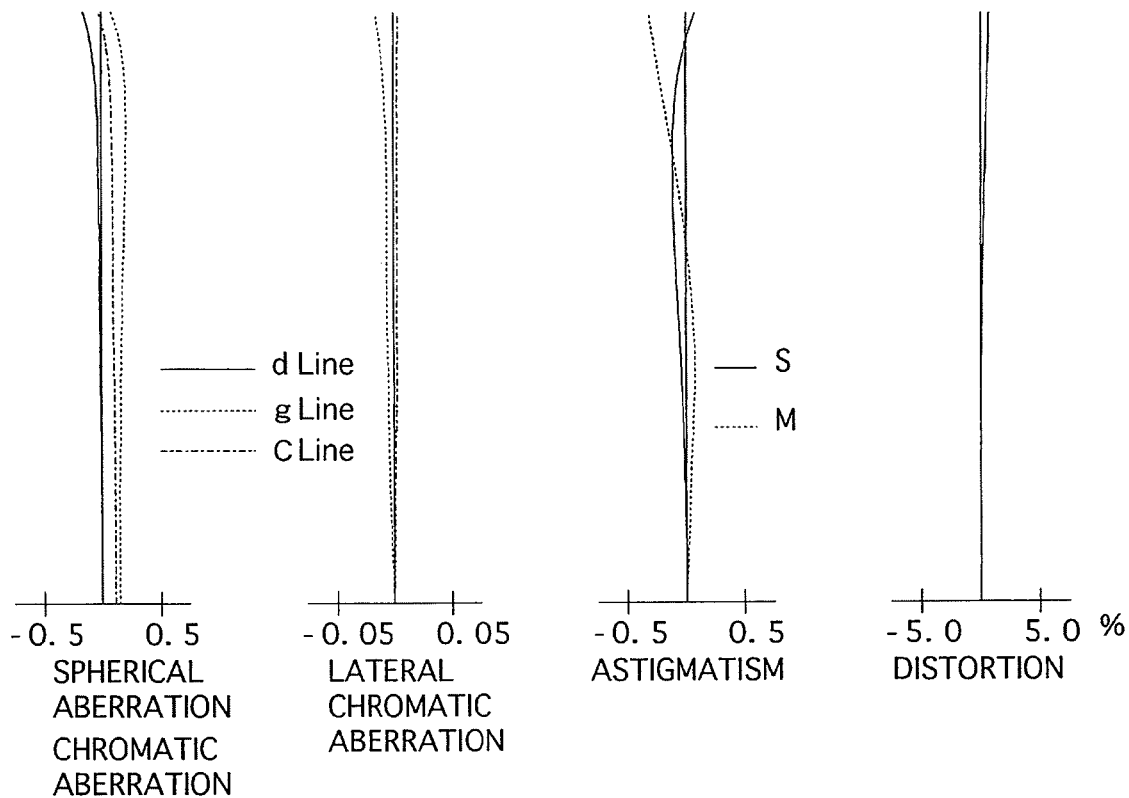
FIGS. 20A, 20B, 20C and 20D show various aberrations of the lens arrangement shown in FIG. 19.
Figure 21A:
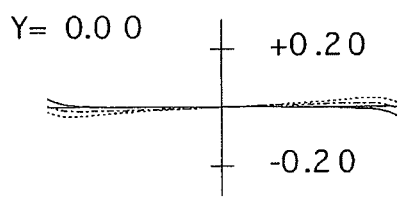
FIGS. 21A, 21B and 21C show lateral aberrations of the lens arrangement shown in FIG. 19.
Figure 21B:
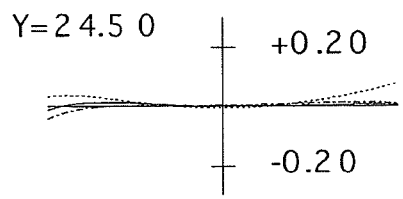
Figure 21C:
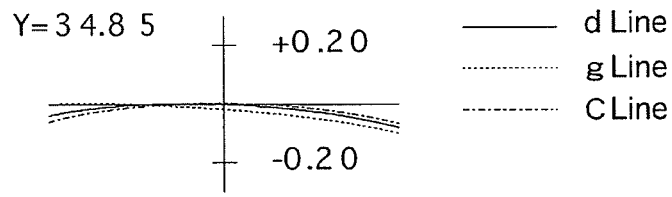
Figure 22:
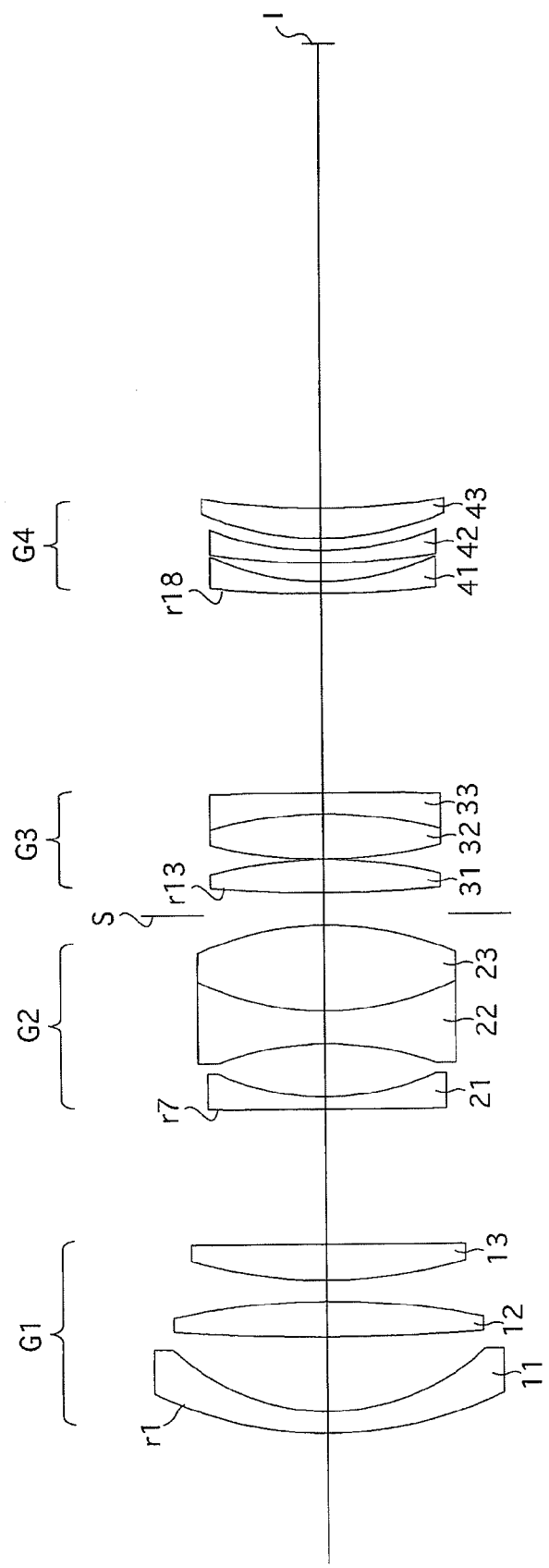
FIG. 22 shows a lens arrangement of the fourth numerical embodiment when an object at a life-sized photographic distance is in an in-focus state.

FIGS. 19 through 24C and Tables 9 through 11 show a fourth numerical embodiment of the macro lens system according to the present invention. FIG. 19 shows a lens arrangement of the fourth numerical embodiment of a macro lens system, according to the present invention, when an object at infinity is in an in-focus state. FIGS. 20A, 20B, 20C and 20D show various aberrations of the lens arrangement shown in FIG. 19. FIGS. 21A, 21B and 21C show lateral aberrations of the lens arrangement shown in FIG. 19. FIG. 22 shows a lens arrangement of the fourth numerical embodiment when an object at a life-sized photographic distance is in an in-focus state. FIGS. 23A, 23B, 23C and 23D show various aberrations of the lens arrangement shown in FIG. 22. FIGS. 24A, 24B and 24C show lateral aberrations of the lens arrangement shown in FIG. 22. Table 9 shows the lens surface data, Table 10 shows various lens system data, and Table 11 shows the aspherical surface data.

The lens arrangement of the fourth numerical embodiment is the same as that of the first numerical embodiment except for the aspects mentioned hereinbelow.

(1) The negative lens element 11 of the first lens group G1 has an aspherical surface formed on the image side thereof.

(2) The positive lens element 13 of the first lens group G1 is a biconvex positive lens element.

TABLE 9

SURFACE DATA

| Surf. No. | r | d | N(d) | νd |
|---|---|---|---|---|
| 1 | 62.821 | 3.300 | 1.80139 | 45.5 |
| 2* | 36.034 | 11.412 | | |
| 3 | 339.159 | 5.307 | 1.72916 | 54.7 |
| 4 | −125.685 | 3.212 | | |
| 5 | 78.475 | 5.315 | 1.60311 | 60.7 |
| 6 | −6700.464 | d6 | | |
| 7 | 3268.564 | 1.900 | 1.56883 | 56.0 |
| 8 | 41.960 | 8.059 | | |
| 9 | −49.199 | 4.990 | 1.70154 | 41.2 |
| 10 | 45.823 | 13.058 | 1.83481 | 42.7 |
| 11 | −50.103 | d11 | | |
| 12(Diaphragm) | ∞ | d12 | | |
| 13 | 216.108 | 5.019 | 1.49700 | 81.6 |
| 14 | −71.779 | 0.100 | | |
| 15 | 74.031 | 6.864 | 1.60311 | 60.7 |
| 16 | −69.998 | 3.256 | 1.84666 | 23.8 |
| 17 | −837.790 | d17 | | |
| 18 | 172.777 | 1.900 | 1.72342 | 38.0 |
| 19 | 41.560 | 2.779 | | |

TABLE 9-continued

SURFACE DATA

| Surf. No. | r | d | N(d) | νd |
|---|---|---|---|---|
| 20 | 117.629 | 1.900 | 1.60311 | 60.7 |
| 21 | 50.196 | 1.850 | | |
| 22 | 47.851 | 4.587 | 1.80518 | 25.5 |
| 23 | 117.265 | — | | |

The asterisk (*) designates an aspherical surface which is rotationally symmetrical with respect to the optical axis.

TABLE 10

LENS SYSTEM DATA

| | Infinite Photographic State | Life-Sized (−1.0:1) Photographic State |
|---|---|---|
| FNO. (FE) | 2.9 | (4.2) |
| f | 89.52 | 60.35 |
| W | 21.1 | 14.3 |
| Y | 34.85 | 34.85 |
| fB | 69.78 | 69.78 |
| L | 210.26 | 210.26 |
| d6 | 4.000 | 20.419 |
| d11 | 18.019 | 1.600 |
| d12 | 31.162 | 3.350 |
| d17 | 2.500 | 30.312 |

TABLE 11

Aspherical Surface Data (the aspherical surface coefficients not indicated are zero (0.00)):

| Surf. No. | κ | A4 | A6 | A8 |
|---|---|---|---|---|
| 2 | 0.000 | 0.4551E−06 | −0.5499E−10 | 0.1475E−12 |

[Numerical Embodiment 5]

Figure 25:
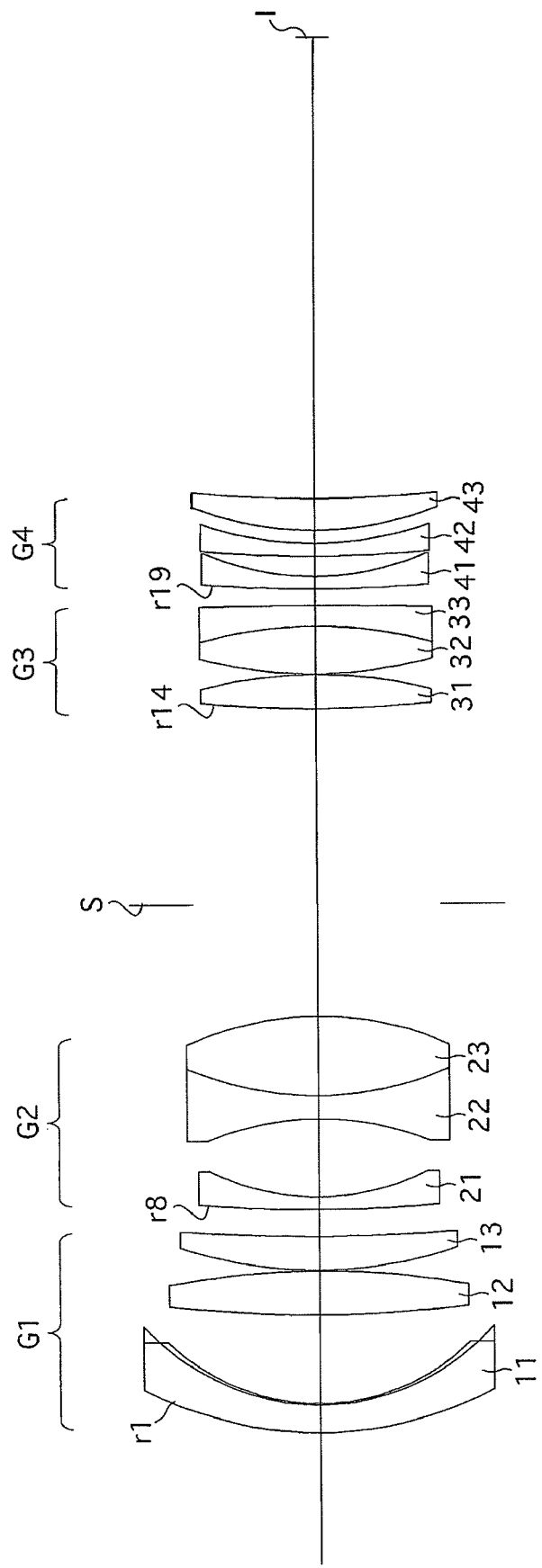
FIG. 25 shows a lens arrangement of a fifth numerical embodiment of a macro lens system, according to the present invention, when an object at infinity is in an in-focus state.
Figures 26A, 26B, 26C, 26D:
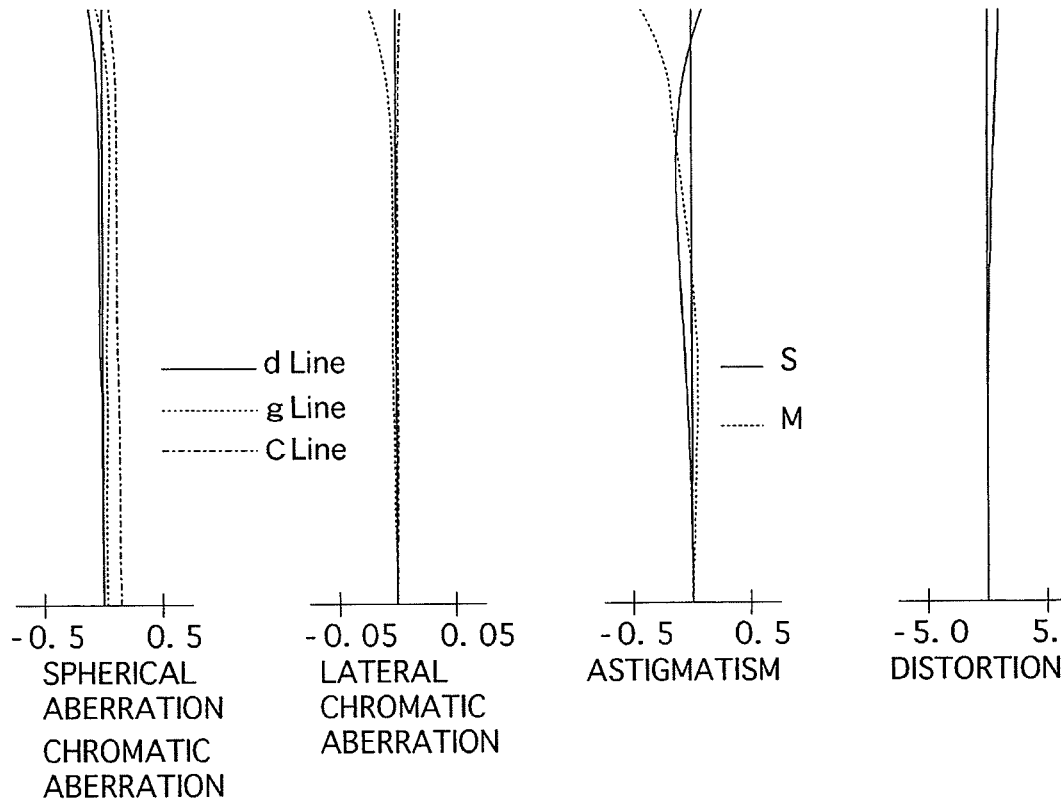
FIGS. 26A, 26B, 26C and 26D show various aberrations of the lens arrangement shown in FIG. 25.
Figure 27A:
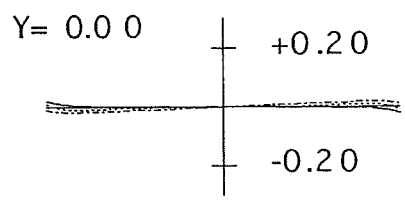
FIGS. 27A, 27B and 27C show lateral aberrations of the lens arrangement shown in FIG. 25.
Figure 27B:
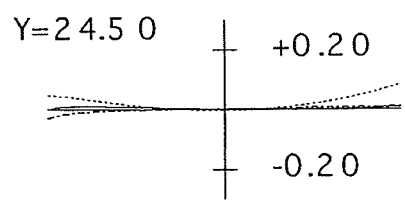
Figure 27C:
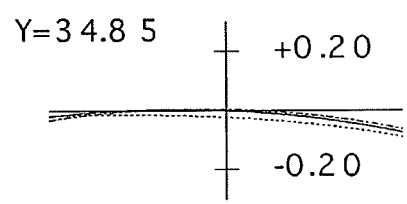
Figure 28:
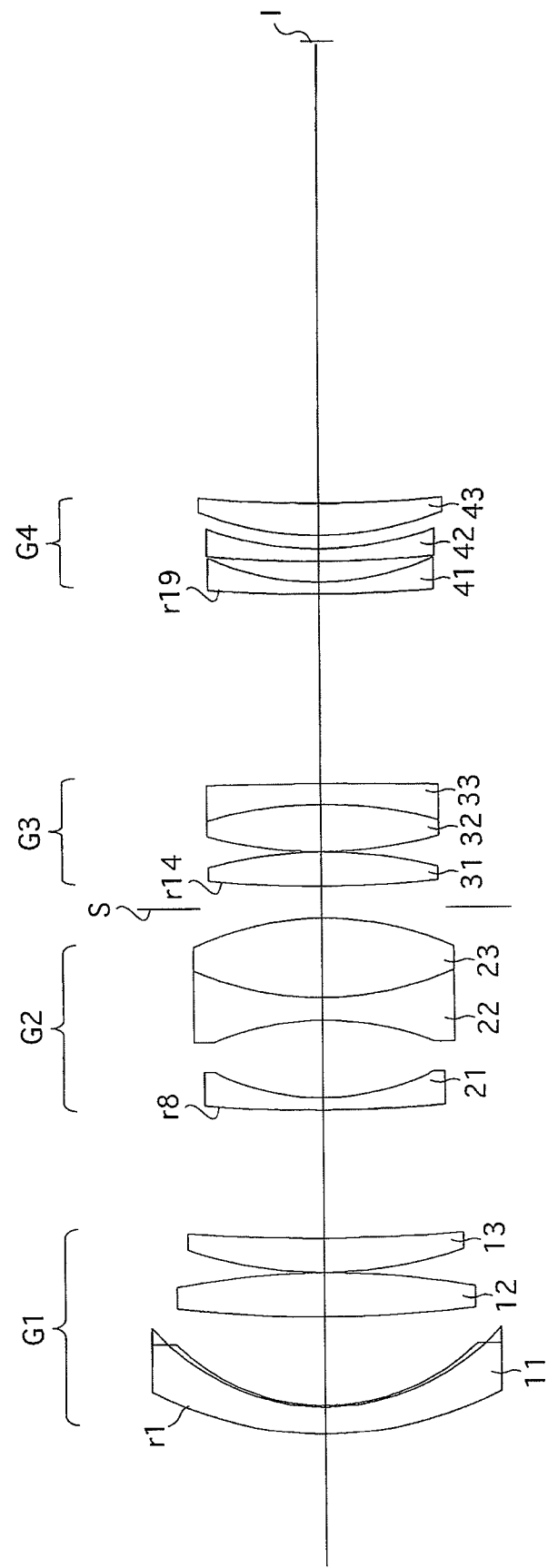
FIG. 28 shows a lens arrangement of the fifth numerical embodiment when an object at a life-sized photographic distance is in an in-focus state.
Figures 29A, 29B, 29C, 29D:
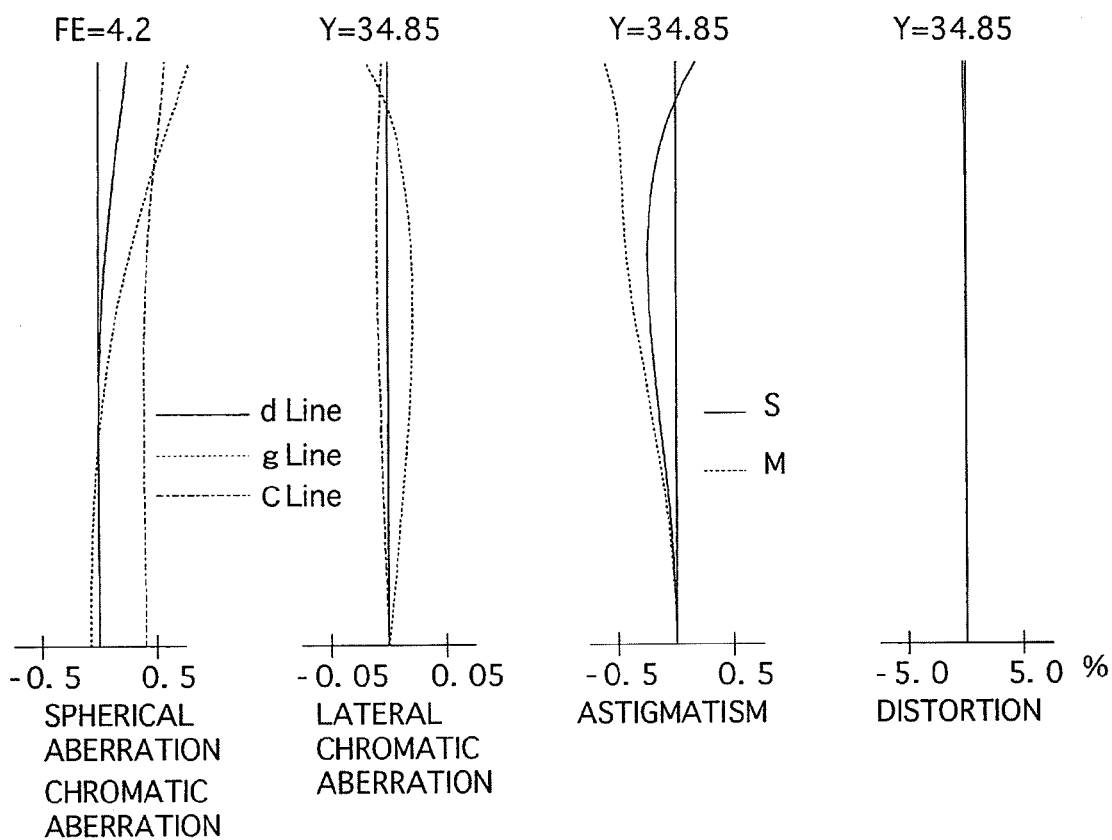
FIGS. 29A, 29B, 29C and 29D show various aberrations of the lens arrangement shown in FIG. 28.
Figure 30A:
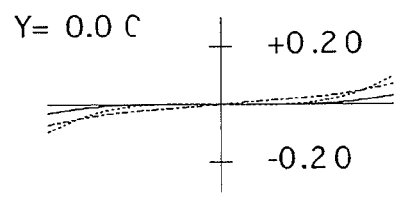
FIGS. 30A, 30B and 30C show lateral aberrations of the lens arrangement shown in FIG. 28.
Figure 30B:
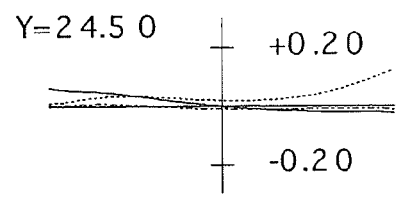
Figure 30C:
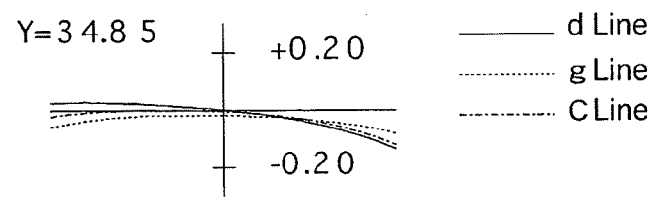

FIGS. 25 through 30C and Tables 12 through 14 show a fifth numerical embodiment of the macro lens system according to the present invention. FIG. 25 shows a lens arrangement of the fifth numerical embodiment of a macro lens system, according to the present invention, when an object at infinity is in an in-focus state. FIGS. 26A, 26B, 26C and 26D show various aberrations of the lens arrangement shown in FIG. 25. FIGS. 27A, 27B and 27C show lateral aberrations of the lens arrangement shown in FIG. 25. FIG. 28 shows a lens arrangement of the fifth numerical embodiment when an object at a life-sized photographic distance is in an in-focus state. FIGS. 29A, 29B, 29C and 29D show various aberrations of the lens arrangement shown in FIG. 28. FIGS. 30A, 30B and 30C show lateral aberrations of the lens arrangement shown in FIG. 28. Table 12 shows the lens surface data, Table 13 shows various lens system data, and Table 14 shows the aspherical surface data.

The lens arrangement of the fifth numerical embodiment is the same as that of the first numerical embodiment except for the negative lens element 21 of the second lens group G2 having an aspherical surface on the object side thereof.

TABLE 12

SURFACE DATA

| Surf. No. | r | d | N(d) | νd |
|---|---|---|---|---|
| 1 | 58.538 | 4.100 | 1.78590 | 44.2 |
| 2 | 35.594 | 0.200 | 1.52972 | 42.7 |
| 3* | 33.720 | 13.488 | | |
| 4 | 208.240 | 6.492 | 1.72916 | 54.7 |
| 5 | −129.319 | 0.100 | | |
| 6 | 67.597 | 5.067 | 1.60311 | 60.7 |
| 7 | 284.751 | d7 | | |
| 8* | 247.385 | 1.900 | 1.58636 | 60.9 |
| 9 | 38.190 | 11.642 | | |
| 10 | −46.784 | 3.500 | 1.70154 | 41.2 |
| 11 | 50.798 | 12.000 | 1.83481 | 42.7 |
| 12 | −48.366 | d12 | | |
| 13(Diaphragm) | ∞ | d13 | | |
| 14 | 184.388 | 5.106 | 1.49700 | 81.6 |
| 15 | −70.955 | 0.100 | | |
| 16 | 69.827 | 7.101 | 1.60311 | 60.7 |
| 17 | −66.871 | 3.109 | 1.84666 | 23.8 |
| 18 | −1195.434 | d18 | | |
| 19 | 237.947 | 1.900 | 1.72342 | 38.0 |
| 20 | 43.093 | 3.074 | | |
| 21 | 188.099 | 1.900 | 1.65160 | 58.4 |
| 22 | 52.498 | 2.003 | | |
| 23 | 51.712 | 4.796 | 1.80518 | 25.5 |
| 24 | 199.918 | — | | |

The asterisk (*) designates an aspherical surface which is rotationally symmetrical with respect to the optical axis.

TABLE 13

LENS SYSTEM DATA

| | Infinite Photographic State | Life-Sized (−1.0:1) Photographic State |
|---|---|---|
| FNO. (FE) | 2.9 | (4.2) |
| f | 91.90 | 60.49 |
| W | 20.6 | 14.2 |
| Y | 34.85 | 34.85 |
| fB | 68.53 | 68.53 |
| L | 208.72 | 208.72 |
| d7 | 4.000 | 19.232 |
| d12 | 16.732 | 1.500 |
| d13 | 29.388 | 3.300 |
| d18 | 2.500 | 28.588 |

TABLE 14

Aspherical Surface Data (the aspherical surface coefficients not indicated are zero (0.00)):

| Surf. No. | K | A4 | A6 | A8 | A10 |
|---|---|---|---|---|---|
| 3 | 0.000 | 0.7228E−06 | −0.9532E−10 | 0.4014E−12 | −0.3390E−15 |
| 8 | 0.000 | 0.7363E−06 | 0.3207E−09 | 0.8214E−12 | |

[Numerical Embodiment 6]

Figure 31:
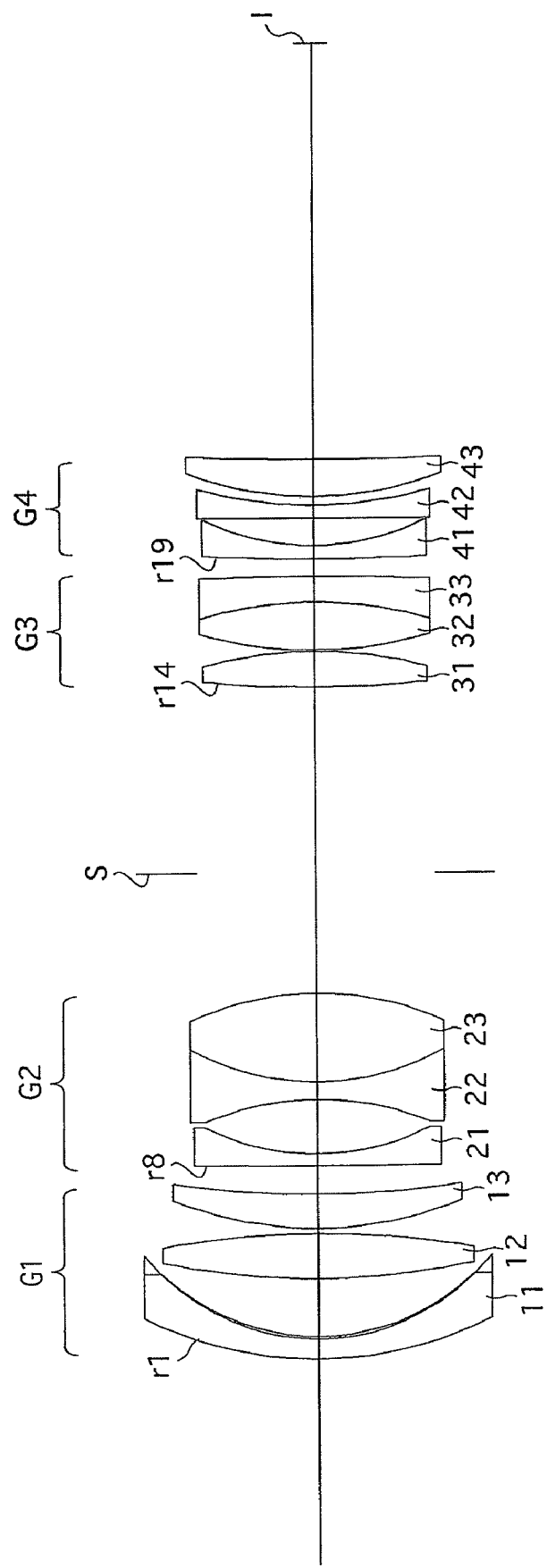
FIG. 31 shows a lens arrangement of a sixth numerical embodiment of a macro lens system, according to the present invention, when an object at infinity is in an in-focus state.
Figures 41A, 41B, 41C, 41D:
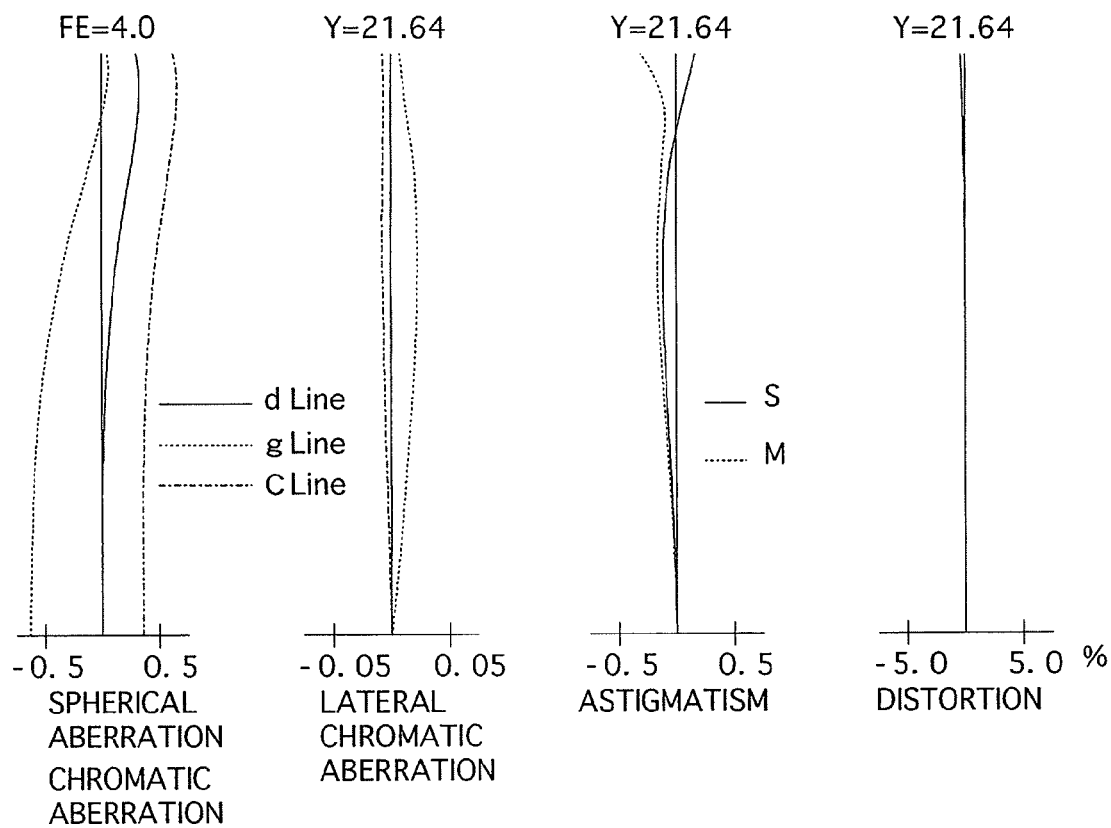
FIGS. 41A, 41B, 41C and 41D show various aberrations of the lens arrangement shown in FIG. 40.

FIGS. 31 through 36C and Tables 15 through 17 show a sixth numerical embodiment of the macro lens system according to the present invention. FIG. 31 shows a lens arrangement of the sixth numerical embodiment of a macro lens system, according to the present invention, when an object at infinity is in an in-focus state. FIGS. 32A, 32B, 32C and 32D show various aberrations of the lens arrangement shown in FIG. 31. FIGS. 33A, 33B and 33C show lateral aberrations of the lens arrangement shown in FIG. 31. FIG. 34 shows a lens arrangement of the sixth numerical embodiment when an object at a life-sized photographic distance is in an in-focus state. FIGS. 35A, 35B, 35C and 35D show various aberrations of the lens arrangement shown in FIG. 34. FIGS. 36A, 36B and 36C show lateral aberrations of the lens arrangement shown in FIG. 34. Table 15 shows the lens surface data, Table 16 shows various lens system data, and Table 17 shows the aspherical surface data.

The lens arrangement of the sixth numerical embodiment is the same as that of the first numerical embodiment.

TABLE 16

LENS SYSTEM DATA

|  | Infinite Photographic State | Life-Sized (−1.0:1) Photographic State |
|---|---|---|
| FNO. (FE) | 2.9 | (4.2) |
| f | 59.56 | 37.78 |
| W | 19.8 | 13.4 |
| Y | 21.64 | 21.64 |
| fB | 39.72 | 39.72 |
| L | 126.32 | 126.32 |
| d7 | 2.740 | 13.271 |
| d12 | 11.620 | 1.090 |
| d13 | 17.965 | 2.280 |
| d18 | 1.700 | 17.385 |

TABLE 17

Aspherical Surface Data (the aspherical surface coefficients not indicated are zero (0.00)):

| Surf. No. | K | A4 | A6 | A8 | A10 | A12 |
|---|---|---|---|---|---|---|
| 3 | 0.000 | 0.7098E−06 | 0.1105E−07 | −0.5748E−10 | 0.1008E−12 | 0.5344E−16 |

TABLE 15

SURFACE DATA

| Surf. No. | r | d | N (d) | vd |
|---|---|---|---|---|
| 1 | 39.206 | 1.900 | 1.83481 | 42.7 |
| 2 | 22.239 | 0.200 | 1.52972 | 42.7 |
| 3* | 22.667 | 5.515 |  |  |
| 4 | 77.666 | 4.295 | 1.72916 | 54.7 |
| 5 | −89.706 | 0.500 |  |  |
| 6 | 38.075 | 3.270 | 1.60311 | 60.7 |
| 7 | 94.651 | d7 |  |  |
| 8 | 1039.216 | 1.200 | 1.58913 | 61.2 |
| 9 | 25.436 | 5.150 |  |  |
| 10 | −29.797 | 1.700 | 1.70154 | 41.2 |
| 11 | 25.978 | 8.590 | 1.83481 | 42.7 |
| 12 | −30.192 | d12 |  |  |
| 13(Diaphragm) | ∞ | d13 |  |  |
| 14 | 119.639 | 3.433 | 1.49700 | 81.6 |
| 15 | −42.524 | 0.100 |  |  |
| 16 | 40.600 | 4.626 | 1.58913 | 61.2 |
| 17 | −40.743 | 2.491 | 1.84666 | 23.8 |
| 18 | −385.713 | d18 |  |  |
| 19 | 213.039 | 1.300 | 1.72342 | 38.0 |
| 20 | 25.057 | 2.576 |  |  |
| 21 | 2489.843 | 1.300 | 1.60311 | 60.7 |
| 22 | 41.330 | 0.844 |  |  |
| 23 | 35.297 | 3.587 | 1.80518 | 25.5 |
| 24 | 259.291 | — |  |  |

The asterisk (*) designates an aspherical surface which is rotationally symmetrical with respect to the optical axis.

[Numerical Embodiment 7]

Figure 42A:
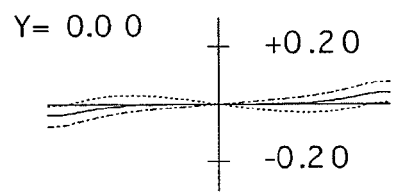
FIGS. 42A, 42B and 42C show lateral aberrations of the lens arrangement shown in FIG. 40.
Figure 42B:
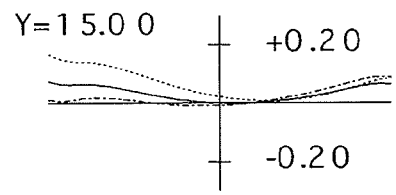
Figure 42C:
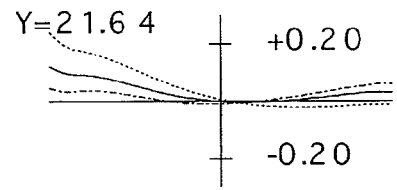

FIGS. 37 through 42C and Tables 18 through 20 show a seventh numerical embodiment of the macro lens system according to the present invention. FIG. 37 shows a lens arrangement of the seventh numerical embodiment of a macro lens system, according to the present invention, when an object at infinity is in an in-focus state. FIGS. 38A, 38B, 38C and 38D show various aberrations of the lens arrangement shown in FIG. 37. FIGS. 39A, 39B and 39C show lateral aberrations of the lens arrangement shown in FIG. 37. FIG. 40 shows a lens arrangement of the seventh numerical embodiment when an object at a life-sized photographic distance is in an in-focus state. FIGS. 41A, 41B, 41C and 41D show various aberrations of the lens arrangement shown in FIG. 40. FIGS. 42A, 42B and 42C show lateral aberrations of the lens arrangement shown in FIG. 40. Table 18 shows the lens surface data, Table 19 shows various lens system data, and Table 20 shows the aspherical surface data.

The lens arrangement of the seventh numerical embodiment is the same as that of the fourth numerical embodiment.

TABLE 18

SURFACE DATA

| Surf. No. | r | d | N (d) | vd |
|---|---|---|---|---|
| 1 | 42.576 | 1.224 | 1.82080 | 42.7 |
| 2* | 25.532 | 4.063 |  |  |
| 3 | 80.703 | 4.430 | 1.72916 | 54.7 |
| 4 | −79.909 | 0.218 |  |  |
| 5 | 123.519 | 2.415 | 1.60311 | 60.7 |
| 6 | −2577.765 | d6 |  |  |
| 7 | 117.431 | 1.557 | 1.54814 | 45.8 |
| 8 | 23.180 | 5.796 |  |  |
| 9 | −26.154 | 1.500 | 1.70154 | 41.2 |

TABLE 18-continued

SURFACE DATA

| Surf. No. | r | d | N (d) | νd |
|---|---|---|---|---|
| 10 | 25.041 | 8.421 | 1.80610 | 40.7 |
| 11 | −27.642 | d11 | | |
| 12(Diaphragm) | ∞ | d12 | | |
| 13 | 107.579 | 3.667 | 1.49700 | 81.6 |
| 14 | −45.015 | 0.100 | | |
| 15 | 43.030 | 4.989 | 1.60311 | 60.7 |
| 16 | −39.811 | 1.647 | 1.84666 | 23.8 |
| 17 | −162.408 | d17 | | |
| 18 | 95.461 | 1.500 | 1.74330 | 49.2 |
| 19 | 20.135 | 3.075 | | |
| 20 | 256.417 | 1.500 | 1.63980 | 34.6 |
| 21 | 67.162 | 0.129 | | |
| 22 | 27.136 | 2.762 | 1.80518 | 25.5 |
| 23 | 47.599 | — | | |

The asterisk (*) designates an aspherical surface which is rotationally symmetrical with respect to the optical axis.

TABLE 19

LENS SYSTEM DATA

| | Infinite Photographic State | Life-Sized (−1.0:1) Photographic State |
|---|---|---|
| FNO. (FE) | 2.9 | (4.0) |
| f | 60.82 | 37.33 |
| W | 19.4 | 13.5 |
| Y | 21.64 | 21.64 |
| fB | 42.34 | 42.34 |
| L | 124.50 | 124.50 |
| d6 | 3.204 | 14.856 |
| d11 | 12.651 | 1.000 |
| d12 | 15.813 | 2.005 |
| d17 | 1.500 | 15.308 |

TABLE 20

Aspherical Surface Data (the aspherical surface coefficients not indicated are zero (0.00)):

| Surf. No. | K | A4 | A6 | A8 | A10 |
|---|---|---|---|---|---|
| 2 | 0.000 | 0.4813E−05 | 0.3006E−08 | 0.4575E−11 | 0.3570E−13 |

[Numerical Embodiment 8]

Figure 43:
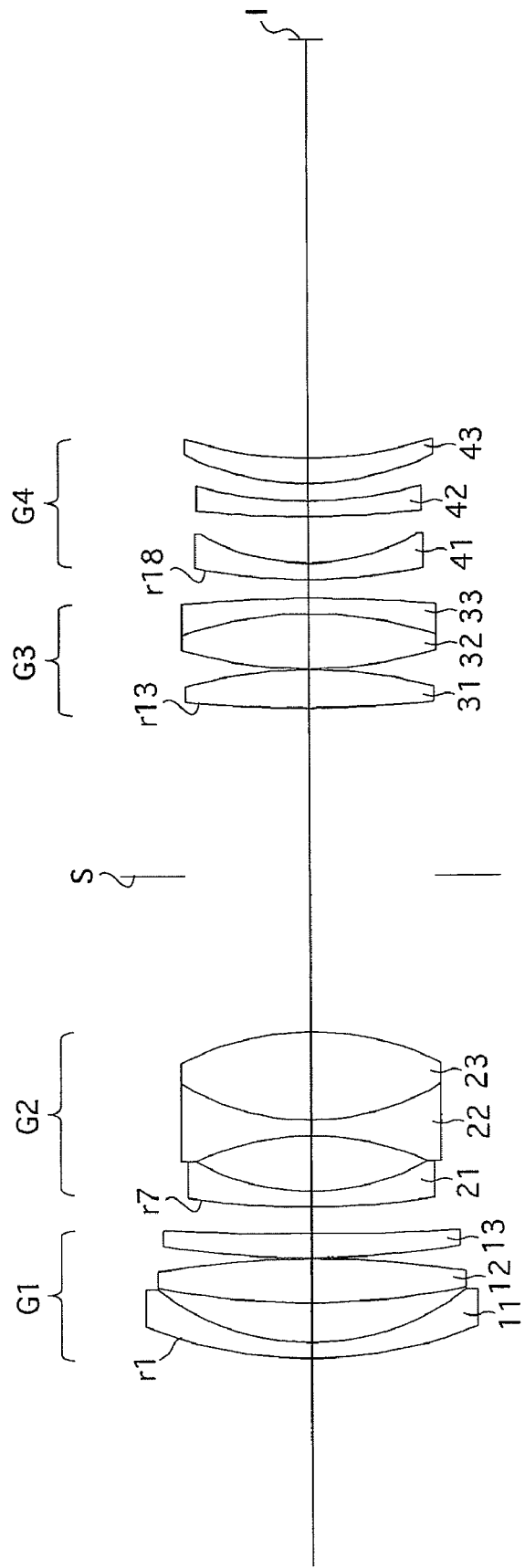
FIG. 43 shows a lens arrangement of an eighth numerical embodiment of a macro lens system, according to the present invention, when an object at infinity is in an in-focus state.
Figure 46:
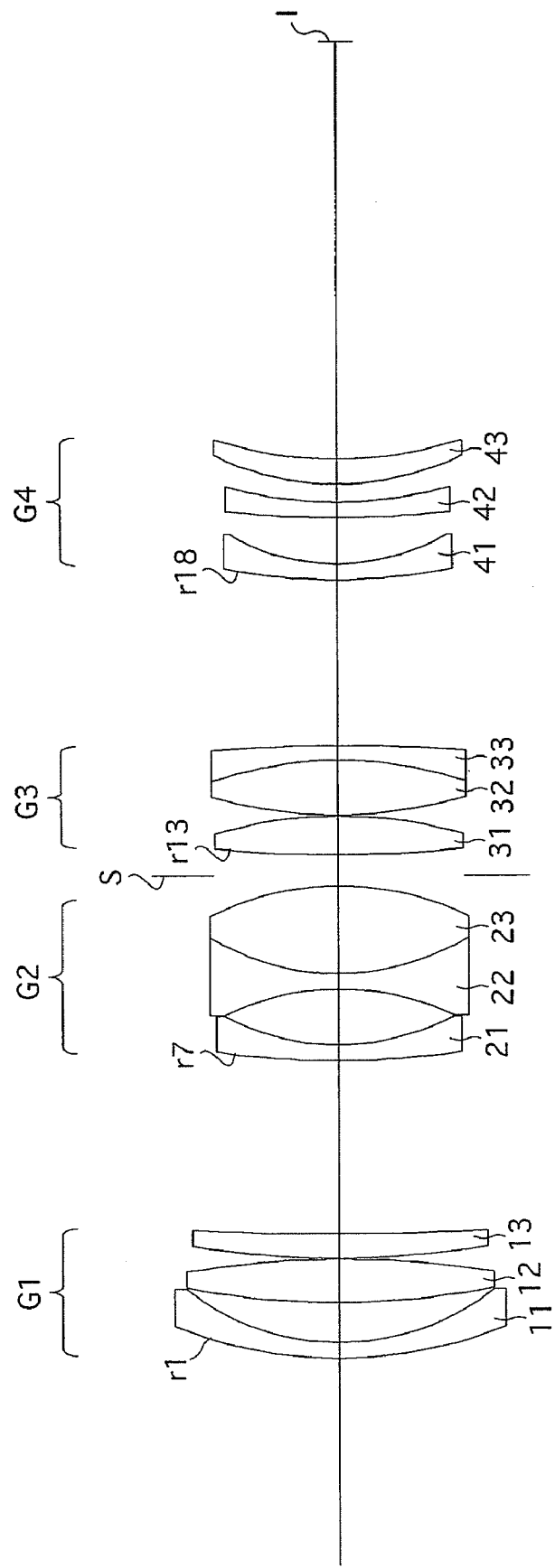
FIG. 46 shows a lens arrangement of the eighth numerical embodiment when an object at a life-sized photographic distance is in an in-focus state.

FIGS. 43 through 48C and Tables 21 through 23 show a eighth numerical embodiment of the macro lens system according to the present invention. FIG. 43 shows a lens arrangement of the eighth numerical embodiment of a macro lens system, according to the present invention, when an object at infinity is in an in-focus state. FIGS. 44A, 44B, 44C and 44D show various aberrations of the lens arrangement shown in FIG. 43. FIGS. 45A, 45B and 45C show lateral aberrations of the lens arrangement shown in FIG. 43. FIG. 46 shows a lens arrangement of the eighth numerical embodiment when an object at a life-sized photographic distance is in an in-focus state. FIGS. 47A, 47B, 47C and 47D show various aberrations of the lens arrangement shown in FIG. 46. FIGS. 48A, 48B and 48C show lateral aberrations of the lens arrangement shown in FIG. 46. Table 21 shows the lens surface data, Table 22 shows various lens system data, and Table 23 shows the aspherical surface data.

The lens arrangement of the eighth numerical embodiment is the same as that of the fourth numerical embodiment except for the following aspects mentioned hereinbelow.

(1) The positive lens element 13 of the first lens group G1 is a positive meniscus lens element having the convex surface facing toward the object.

(2) The negative lens element 41 of the fourth lens group G4 has an aspherical surface on the object side thereof.

TABLE 21

SURFACE DATA

| Surf. No. | r | d | N (d) | νd |
|---|---|---|---|---|
| 1 | 44.299 | 1.500 | 1.82080 | 42.7 |
| 2* | 25.912 | 3.783 | | |
| 3 | 80.430 | 4.143 | 1.72916 | 54.7 |
| 4 | −91.355 | 0.100 | | |
| 5 | 94.260 | 2.302 | 1.60311 | 60.7 |
| 6 | 323.327 | d6 | | |
| 7 | 82.011 | 1.500 | 1.58267 | 46.6 |
| 8 | 23.851 | 5.349 | | |
| 9 | −26.712 | 1.500 | 1.70154 | 41.2 |
| 10 | 24.642 | 8.404 | 1.80610 | 40.7 |
| 11 | −28.553 | d11 | | |
| 12(Diaphragm) | ∞ | d12 | | |
| 13 | 131.268 | 3.671 | 1.49700 | 81.6 |
| 14 | −45.191 | 0.100 | | |
| 15 | 42.810 | 5.274 | 1.60311 | 60.7 |
| 16 | −39.214 | 1.500 | 1.84666 | 23.8 |
| 17 | −136.258 | d17 | | |
| 18* | 58.120 | 1.500 | 1.69350 | 53.2 |
| 19 | 21.010 | 4.458 | | |
| 20 | 100.000 | 1.500 | 1.77250 | 49.6 |
| 21 | 40.457 | 1.717 | | |
| 22 | 27.706 | 2.406 | 1.80518 | 25.5 |
| 23 | 39.459 | — | | |

The asterisk (*) designates an aspherical surface which is rotationally symmetrical with respect to the optical axis.

TABLE 22

LENS SYSTEM DATA

| | Infinite Photographic State | Life-Sized (−1.0:1) Photographic State |
|---|---|---|
| FNO. (FE) | 2.9 | (4.0) |
| f | 60.76 | 37.05 |
| W | 19.4 | 13.1 |
| Y | 21.64 | 21.64 |
| fB | 39.57 | 39.57 |
| L | 125.68 | 125.68 |
| d6 | 2.500 | 16.519 |
| d11 | 15.019 | 1.000 |
| d12 | 16.080 | 2.000 |
| d17 | 1.809 | 15.889 |

TABLE 23

Aspherical Surface Data (the aspherical surface coefficients not indicated are zero (0.00)):

| Surf. No. | K | A4 | A6 | A8 | A10 |
|---|---|---|---|---|---|
| 2 | 0.000 | 0.4709E−05 | −0.6964E−09 | 0.3503E−10 | −0.1789E−13 |
| 18 | 0.000 | −0.9601E−06 | −0.1336E−07 | 0.9001E−10 | −0.2465E−12 |

[Numerical Embodiment 9]

Figure 49:
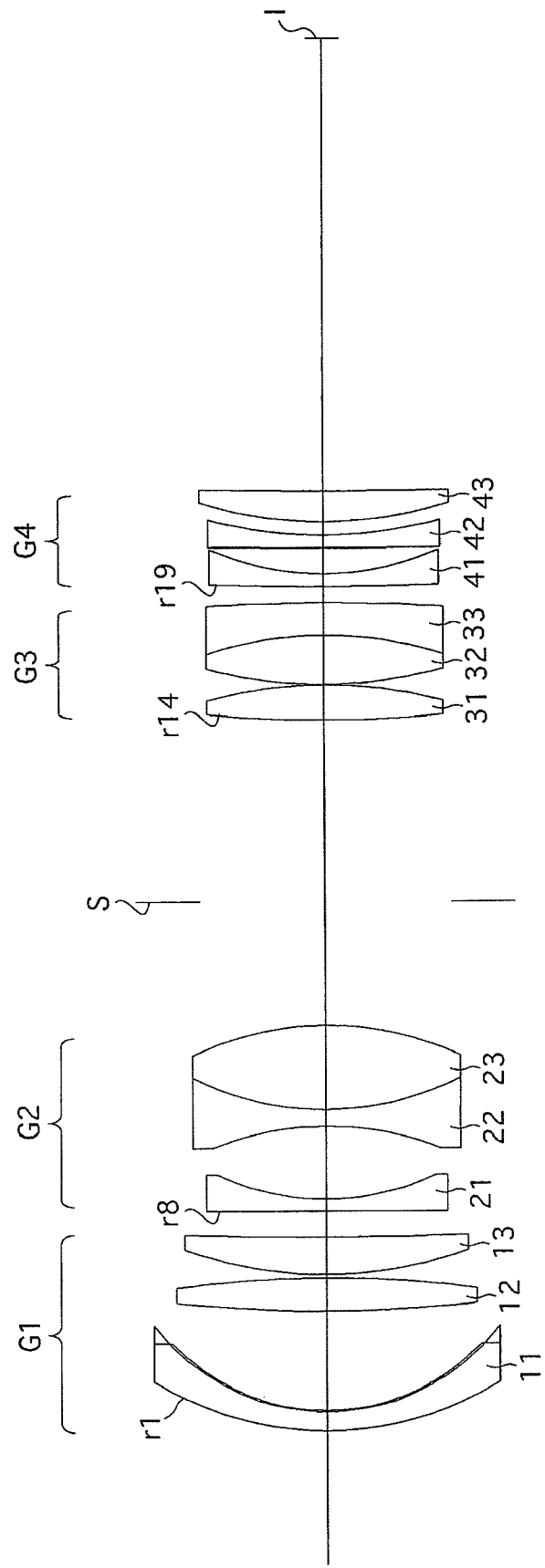
FIG. 49 shows a lens arrangement of a ninth numerical embodiment of a macro lens, according to the present invention, when an object at infinity is in an in-focus state.
Figure 52:
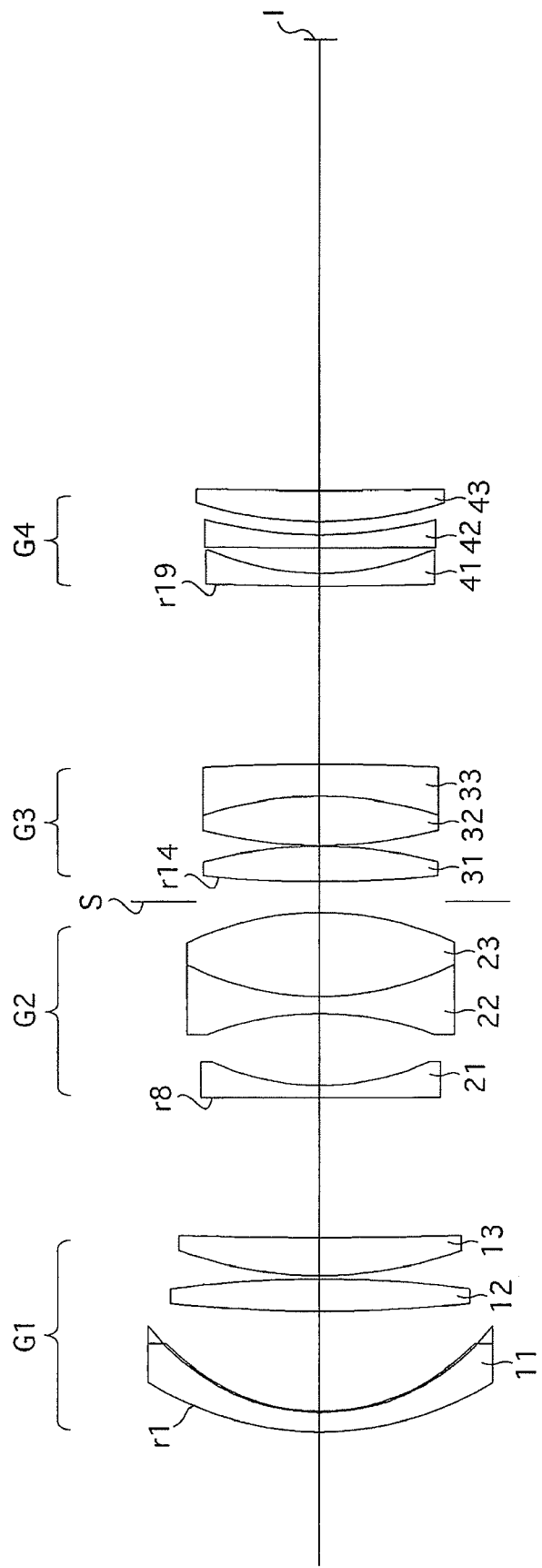
FIG. 52 shows a lens arrangement of the ninth numerical embodiment when an object at a life-sized photographic distance is in an in-focus state.

FIGS. 49 through 54C and Tables 24 through 26 show a ninth numerical embodiment of the macro lens system according to the present invention. FIG. 49 shows a lens arrangement of the ninth numerical embodiment of a macro lens system, according to the present invention, when an object at infinity is in an in-focus state. FIGS. 50A, 50B, 50C and 50D show various aberrations of the lens arrangement shown in FIG. 49. FIGS. 51A, 51B and 51C show lateral aberrations of the lens arrangement shown in FIG. 49. FIG. 52 shows a lens arrangement of the ninth numerical embodiment when an object at a life-sized photographic distance is in an in-focus state. FIGS. 53A, 53B, 53C and 53D show various aberrations of the lens arrangement shown in FIG. 52. FIGS. 54A, 54B and 54C show lateral aberrations of the lens arrangement shown in FIG. 52. Table 24 shows the lens surface data, Table 25 shows various lens system data, and Table 26 shows the aspherical surface data.

The lens arrangement of the ninth numerical embodiment is the same as that of the first numerical embodiment except that the negative lens element 21 of the second lens group G2 is a biconcave negative lens element.

TABLE 24

SURFACE DATA

| Surf. No. | r | d | N (d) | vd |
|---|---|---|---|---|
| 1 | 50.345 | 2.800 | 1.78590 | 43.9 |
| 2 | 32.682 | 0.200 | 1.52972 | 42.7 |
| 3* | 31.959 | 14.964 | | |
| 4 | 235.757 | 4.740 | 1.72916 | 54.7 |
| 5 | −172.841 | 0.500 | | |
| 6 | 64.160 | 5.580 | 1.60311 | 60.7 |
| 7 | 721.891 | d7 | | |
| 8 | −8034.427 | 1.800 | 1.56384 | 60.8 |
| 9 | 40.294 | 10.761 | | |
| 10 | −47.886 | 2.500 | 1.70154 | 41.2 |
| 11 | 45.430 | 12.442 | 1.83481 | 42.7 |
| 12 | −48.059 | d12 | | |
| 13(Diaphragm) | ∞ | d13 | | |
| 14 | 188.026 | 5.213 | 1.49700 | 81.6 |
| 15 | −69.841 | 0.100 | | |
| 16 | 69.149 | 7.326 | 1.58913 | 61.2 |
| 17 | −57.687 | 4.745 | 1.84666 | 23.8 |
| 18 | −346.120 | d18 | | |
| 19 | 564.418 | 1.900 | 1.60562 | 43.7 |
| 20 | 42.724 | 3.830 | | |
| 21 | 2782.398 | 1.900 | 1.78800 | 47.5 |
| 22 | 68.410 | 1.977 | | |
| 23 | 63.292 | 4.649 | 1.80518 | 25.5 |
| 24 | 1242.526 | — | | |

The asterisk (*) designates an aspherical surface which is rotationally symmetrical with respect to the optical axis.

TABLE 25

LENS SYSTEM DATA

| | Infinite Photographic State | Life-Sized (−1.0:1) Photographic State |
|---|---|---|
| FNO. (FE) | 2.9 | (4.1) |
| f | 91.86 | 60.02 |
| W | 20.6 | 14.1 |
| Y | 34.85 | 34.85 |
| fB | 66.29 | 66.29 |
| L | 205.94 | 205.94 |
| d7 | 3.800 | 20.694 |
| d12 | 18.494 | 1.600 |
| d13 | 26.927 | 3.000 |
| d18 | 2.500 | 26.427 |

TABLE 26

Aspherical Surface Data (the aspherical surface coefficients not indicated are zero (0.00)):

| Surf. No. | K | A4 | A6 | A8 | A10 |
|---|---|---|---|---|---|
| 3 | 0.000 | −0.1084E−07 | −0.2757E−09 | −0.1998E−12 | −0.5903E−15 |

The numerical values of each condition for each numerical embodiment are shown in Table 27.

TABLE 27

| | Embod. 1 | Embod. 2 | Embod. 3 |
|---|---|---|---|
| Cond. (1) | −3.84 | −4.14 | −4.55 |
| Cond. (2) | −1.20 | −1.13 | −1.16 |
| Cond. (3) | 11.60 | 5.90 | 6.92 |
| Cond. (4) | 0.23 | 0.40 | 0.38 |
| Cond. (5) | 2.35 | 2.35 | 2.18 |

| | Embod. 4 | Embod. 5 | Embod. 6 |
|---|---|---|---|
| Cond. (1) | −4.03 | −3.57 | −3.27 |
| Cond. (2) | −1.25 | −1.24 | −1.12 |
| Cond. (3) | 5.50 | 7.94 | 6.83 |
| Cond. (4) | 0.43 | 0.31 | 0.34 |
| Cond. (5) | 2.38 | 2.40 | 2.39 |

| | Embod. 7 | Embod. 8 | Embod. 9 |
|---|---|---|---|
| Cond. (1) | −3.82 | −4.40 | −3.20 |
| Cond. (2) | −1.32 | −1.30 | −1.33 |
| Cond. (3) | 3.20 | 2.30 | 14.28 |
| Cond. (4) | 0.61 | 0.74 | 0.18 |
| Cond. (5) | 2.37 | 2.42 | 2.49 |

As can be understood from Table 27, the first through ninth numerical embodiments satisfy conditions (1) through (5). Furthermore, as can be understood from the aberration diagrams, the various aberrations are suitably corrected.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A macro lens system comprises a positive first lens group, a negative second lens group, a positive third lens group, and a negative fourth lens group, in that order from an object, wherein upon focusing from an infinite photographic distance to a life-sized photographic distance, said first lens group remains stationary with respect to the imaging plane, and said second and third lens groups move along the optical axis direction, wherein said macro lens system satisfies the following condition:

$$-4.6 < f_2/f_i < -3.0$$

wherein $f_2$ designates the focal length of said second lens group, and $f_i$ designates the focal length of the entire macro lens system when an object at infinity is in an in-focus state.

2. The macro lens system according to claim 1, further satisfying the following condition:

$$-1.4 < f_{11}/f_i < -1.1$$

wherein $f_{11}$ designates the focal length of the most object-side lens element of the first lens group; and $f_i$ designates the focal length of the entire the macro lens system when an object at infinity is in an in-focus state.

3. The macro lens system according to claim 1, further satisfying the following conditions:

$$m_{1n} > 0 \ldots , \text{ and}$$

$$m_{2n} > 0 \ldots ,$$

wherein $m_{1n}$ designates the lateral magnification of the first lens group when an object at a life-sized photographic distance is in an in-focus state; and $m_{2n}$ designates the lateral magnification of the second lens group when an object at a life-sized photographic distance is in an in-focus state.

4. The macro lens system according to claim 1, further satisfying the following condition:

$$2.1 < m_{2i} < 2.5$$

wherein $m_{2i}$ designates the lateral magnification of said second lens group when an object at infinity is in an in-focus state.

5. The macro lens system according to claim 1, wherein said fourth lens group comprises two negative meniscus lens elements, each having the convex surface facing toward the object, and a positive meniscus lens element having the convex surface facing toward the object, in that order from the object; and wherein an air-distance is defined between each lens element thereof.

6. A macro lens system comprising a positive first lens group, a negative second lens group, a positive third lens group, and a negative fourth lens group, in that order from an object, wherein upon focusing from an infinite photographic distance to a life-sized photographic distance, said first lens group remains stationary with respect to the imaging plane, and said second and third lens groups move along the optical axis direction, wherein said fourth lens group comprises two negative meniscus lens elements, each having the convex surface facing toward the object, and a positive meniscus lens element having the convex surface toward the object, in that order from the object; and wherein an air-distance is defined between each lens element thereof.

* * * * *